(12) United States Patent
Wuester

(10) Patent No.: US 7,380,984 B2
(45) Date of Patent: Jun. 3, 2008

(54) PROCESS FLOW THERMOCOUPLE

(75) Inventor: Christopher D. Wuester, Gilbert, AZ (US)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 11/092,232

(22) Filed: Mar. 28, 2005

(65) Prior Publication Data

US 2006/0215729 A1    Sep. 28, 2006

(51) Int. Cl.
*G01K 13/00* (2006.01)
*G01K 1/08* (2006.01)

(52) U.S. Cl. .................. 374/148; 374/208; 374/141

(58) Field of Classification Search ............. 374/141, 374/163, 208, 148
See application file for complete search history.

(56) References Cited

U.S. PATENT DOCUMENTS

| | | | |
|---|---|---|---|
| 2,617,719 A | 11/1952 | Stewart | |
| 2,625,886 A | 1/1953 | Browne | |
| 2,873,597 A | 2/1959 | Fahringer | |
| 2,981,106 A * | 4/1961 | Knudsen et al. | 136/202 |
| 3,521,765 A | 7/1970 | Kauffman et al. | |
| 3,623,627 A | 11/1971 | Bolton | |
| 3,681,171 A | 8/1972 | Hojo et al. | |
| 3,744,660 A | 7/1973 | Gaines et al. | |
| 3,968,885 A | 7/1976 | Hassan et al. | |
| 3,983,756 A * | 10/1976 | Danguillier et al. | 73/866.5 |
| 4,008,049 A * | 2/1977 | Clemmer et al. | 422/111 |
| 4,029,517 A | 6/1977 | Rand | |
| 4,091,643 A | 5/1978 | Zucchini | |
| 4,145,161 A | 3/1979 | Skinner | |
| 4,245,154 A | 1/1981 | Uehara et al. | |
| 4,316,750 A | 2/1982 | Gengler | 134/18 |
| 4,327,586 A * | 5/1982 | Goddard | 73/866.5 |
| 4,341,592 A | 7/1982 | Shortes et al. | |
| 4,355,937 A | 10/1982 | Mack et al. | |
| 4,367,140 A | 1/1983 | Wilson | |
| 4,391,511 A | 7/1983 | Akiyama et al. | |
| 4,406,596 A | 9/1983 | Budde | |
| 4,422,651 A | 12/1983 | Platts | |

(Continued)

FOREIGN PATENT DOCUMENTS

CN    1399790 A    2/2003

(Continued)

OTHER PUBLICATIONS

Hideaki Itakura et al., "Multi-Chamber Dry Etching System", Solid State Technology, Apr. 1982, pp. 209-214.

(Continued)

*Primary Examiner*—Gail Verbitsky
*Assistant Examiner*—Mirellys Jagen
(74) *Attorney, Agent, or Firm*—Haverstock & Owens LLP

(57) ABSTRACT

A sensor assembly for accurately measuring the temperature of a process fluid flowing within process tubing is disclosed. A thermocouple sensor can be configured within a protective sheath with leads protruding from the sheath. A gland-like structure can be coupled to the sheath or machined integral to the sheath. The sensor assembly can be coupled to a closed loop. The sensor can be positioned within or in close proximity to the fluid flowing in the closed loop, and the sensor accurately measures the temperature of the process fluid flowing in the closed loop. The sensor assembly is easily assembled and/or disassembled allowing the sensor to be maintained.

35 Claims, 7 Drawing Sheets

U.S. PATENT DOCUMENTS

| | | | |
|---|---|---|---|
| 4,426,388 A | 1/1984 | Woltersdorf, Jr. | |
| 4,474,199 A | 10/1984 | Blaudszun | |
| 4,522,788 A | 6/1985 | Sitek et al. | |
| 4,549,467 A | 10/1985 | Wilden et al. | |
| 4,574,184 A | 3/1986 | Wolf et al. | |
| 4,592,306 A | 6/1986 | Gallego | |
| 4,601,181 A | 7/1986 | Privat | |
| 4,618,769 A | 10/1986 | Johnson et al. | 250/338 |
| 4,626,509 A | 12/1986 | Lyman | |
| 4,638,668 A * | 1/1987 | Leverberg et al. | 73/866.5 |
| 4,670,126 A | 6/1987 | Messer et al. | |
| 4,682,937 A | 7/1987 | Credle, Jr. | |
| 4,693,777 A | 9/1987 | Hazano et al. | |
| 4,749,440 A | 6/1988 | Blackwood et al. | |
| 4,772,132 A * | 9/1988 | Hofmann | 374/143 |
| 4,778,356 A | 10/1988 | Hicks | |
| 4,788,043 A | 11/1988 | Kagiyama et al. | |
| 4,789,077 A | 12/1988 | Noe | |
| 4,823,976 A | 4/1989 | White, III et al. | |
| 4,825,808 A | 5/1989 | Takahashi et al. | |
| 4,827,867 A | 5/1989 | Takei et al. | |
| 4,838,476 A | 6/1989 | Rahn | |
| 4,848,927 A * | 7/1989 | Daily et al. | 374/208 |
| 4,865,061 A | 9/1989 | Fowler et al. | |
| 4,879,431 A | 11/1989 | Bertoncini | |
| 4,917,556 A | 4/1990 | Stark et al. | |
| 4,924,892 A | 5/1990 | Kiba et al. | |
| 4,951,601 A | 8/1990 | Maydan et al. | |
| 4,960,140 A | 10/1990 | Ishijima et al. | |
| 4,983,223 A | 1/1991 | Gessner | |
| 5,009,738 A | 4/1991 | Gruenwald et al. | |
| 5,011,542 A | 4/1991 | Weil | |
| 5,028,219 A | 7/1991 | Schuetz et al. | 417/423.4 |
| 5,044,871 A | 9/1991 | Davis et al. | |
| 5,062,770 A | 11/1991 | Story et al. | |
| 5,071,485 A | 12/1991 | Matthews et al. | |
| 5,105,556 A | 4/1992 | Kurokawa et al. | |
| 5,143,103 A | 9/1992 | Basso et al. | |
| 5,167,716 A | 12/1992 | Boitnott et al. | |
| 5,169,296 A | 12/1992 | Wilden | |
| 5,169,408 A | 12/1992 | Biggerstaff et al. | |
| 5,185,296 A | 2/1993 | Morita et al. | |
| 5,186,594 A | 2/1993 | Toshima et al. | |
| 5,186,718 A | 2/1993 | Tepman et al. | |
| 5,188,515 A | 2/1993 | Horn | |
| 5,190,373 A | 3/1993 | Dickson et al. | |
| 5,191,993 A | 3/1993 | Wanger et al. | |
| 5,193,560 A | 3/1993 | Tanaka et al. | |
| 5,195,878 A | 3/1993 | Sahiavo et al. | |
| 5,197,800 A | 3/1993 | Saidman et al. | 366/136 |
| 5,213,485 A | 5/1993 | Wilden | |
| 5,217,043 A | 6/1993 | Novakovi | |
| 5,221,019 A | 6/1993 | Pechacek | |
| 5,222,876 A | 6/1993 | Budde | |
| 5,224,504 A | 7/1993 | Thompson et al. | |
| 5,236,669 A | 8/1993 | Simmons et al. | |
| 5,237,824 A | 8/1993 | Pawliszyn | |
| 5,240,390 A | 8/1993 | Kvinge et al. | |
| 5,242,226 A * | 9/1993 | Ross et al. | 374/208 |
| 5,243,821 A | 9/1993 | Schuck et al. | |
| 5,246,500 A | 9/1993 | Samata et al. | |
| 5,251,776 A | 10/1993 | Morgan, Jr. et al. | |
| 5,252,041 A | 10/1993 | Schumack | |
| 5,259,731 A | 11/1993 | Dhindsa et al. | |
| 5,267,455 A | 12/1993 | Dewees et al. | |
| 5,280,693 A | 1/1994 | Heudecker | |
| 5,285,352 A | 2/1994 | Pastore et al. | |
| 5,288,333 A | 2/1994 | Tanaka et al. | |
| 5,306,350 A | 4/1994 | Hoy et al. | |
| 5,313,965 A | 5/1994 | Palen | |
| 5,314,574 A | 5/1994 | Takahashi | |
| 5,328,722 A | 7/1994 | Ghanayem et al. | |
| 5,331,986 A | 7/1994 | Lim et al. | 134/88 |
| 5,337,446 A | 8/1994 | Smith et al. | |
| 5,339,844 A | 8/1994 | Stanford, Jr. et al. | |
| 5,355,901 A | 10/1994 | Mielnik et al. | |
| 5,368,171 A | 11/1994 | Jackson | |
| 5,370,741 A | 12/1994 | Bergman | |
| 5,374,829 A | 12/1994 | Sakamoto et al. | |
| 5,377,705 A | 1/1995 | Smith, Jr. et al. | |
| 5,401,322 A | 3/1995 | Marshall | |
| 5,404,894 A | 4/1995 | Shiraiwa | |
| 5,412,958 A | 5/1995 | Iliff et al. | |
| 5,417,768 A | 5/1995 | Smith, Jr. et al. | |
| 5,433,334 A | 7/1995 | Reneau | |
| 5,447,294 A | 9/1995 | Sakata et al. | |
| 5,474,410 A | 12/1995 | Ozawa et al. | |
| 5,494,526 A | 2/1996 | Paranjpe | |
| 5,503,176 A | 4/1996 | Dunmire et al. | |
| 5,505,219 A | 4/1996 | Lansberry et al. | |
| 5,509,431 A | 4/1996 | Smith, Jr. et al. | |
| 5,526,834 A | 6/1996 | Mielnik et al. | |
| 5,533,538 A | 7/1996 | Marshall | |
| 5,540,554 A | 7/1996 | Masuzawa | |
| 5,571,330 A | 11/1996 | Kyogoku | |
| 5,589,224 A | 12/1996 | Tepman et al. | |
| 5,621,982 A | 4/1997 | Yamashita et al. | |
| 5,629,918 A | 5/1997 | Ho et al. | |
| 5,644,855 A | 7/1997 | McDermott et al. | |
| 5,649,809 A | 7/1997 | Stapelfeldt | |
| 5,656,097 A | 8/1997 | Olesen et al. | |
| 5,669,251 A | 9/1997 | Townsend et al. | |
| 5,672,204 A | 9/1997 | Habuka | |
| 5,702,228 A | 12/1997 | Tamai et al. | |
| 5,706,319 A | 1/1998 | Holtz | |
| 5,746,008 A | 5/1998 | Yamashita et al. | |
| 5,769,588 A | 6/1998 | Toshima et al. | |
| 5,772,783 A | 6/1998 | Stucker | |
| 5,797,719 A | 8/1998 | James et al. | |
| 5,798,126 A | 8/1998 | Fujikawa et al. | |
| 5,817,178 A | 10/1998 | Mita et al. | |
| 5,850,747 A | 12/1998 | Roberts et al. | |
| 5,858,107 A | 1/1999 | Chao et al. | |
| 5,865,602 A | 2/1999 | Nozari | |
| 5,879,459 A | 3/1999 | Gadgil et al. | |
| 5,881,577 A | 3/1999 | Sauer et al. | |
| 5,882,165 A | 3/1999 | Maydan et al. | |
| 5,882,182 A | 3/1999 | Kato et al. | 417/366 |
| 5,888,050 A | 3/1999 | Fitzgerald et al. | |
| 5,898,727 A | 4/1999 | Fujikawa et al. | |
| 5,900,107 A | 5/1999 | Murphy et al. | |
| 5,904,737 A | 5/1999 | Preston et al. | |
| 5,906,866 A | 5/1999 | Webb | |
| 5,928,389 A | 7/1999 | Jevtic | |
| 5,932,100 A | 8/1999 | Yager et al. | |
| 5,934,856 A | 8/1999 | Asakawa et al. | |
| 5,934,991 A | 8/1999 | Rush | |
| 5,943,721 A | 8/1999 | Lerette et al. | |
| 5,946,945 A | 9/1999 | Kegler et al. | |
| 5,970,554 A | 10/1999 | Shore et al. | |
| 5,971,714 A | 10/1999 | Schaffer et al. | |
| 5,975,492 A | 11/1999 | Brenes | |
| 5,979,306 A | 11/1999 | Fujikawa et al. | |
| 5,980,648 A | 11/1999 | Adler | |
| 5,981,399 A | 11/1999 | Kawamura et al. | |
| 5,989,342 A | 11/1999 | Ikeda et al. | |
| 6,005,226 A | 12/1999 | Aschner et al. | |
| 6,010,315 A | 1/2000 | Kishimoto et al. | 417/228 |
| 6,017,820 A | 1/2000 | Ting et al. | |
| 6,029,371 A | 2/2000 | Kamikawa et al. | |
| 6,035,871 A | 3/2000 | Eui-Yeol | |
| 6,037,277 A | 3/2000 | Masakara et al. | |
| 6,041,817 A | 3/2000 | Guertin | |
| 6,045,331 A | 4/2000 | Gehm et al. | |

| | | | | | | |
|---|---|---|---|---|---|---|
| 6,048,494 | A | 4/2000 | Annapragada | 6,874,513 B2 | 4/2005 | Saito et al. |
| 6,053,348 | A | 4/2000 | Morch | 6,921,456 B2 | 7/2005 | Biberger et al. |
| 6,056,008 | A | 5/2000 | Adams et al. | 6,966,967 B2 | 11/2005 | Curry et al. |
| 6,062,853 | A | 5/2000 | Shimazu et al. | 7,165,883 B2 * | 1/2007 | Nimberger et al. ......... 374/148 |
| 6,067,728 | A | 5/2000 | Farmer et al. | 2001/0050096 A1 | 12/2001 | Costantini et al. |
| 6,070,440 | A | 6/2000 | Malchow et al. | 2002/0001929 A1 | 1/2002 | Biberger |
| 6,077,053 | A | 6/2000 | Fujikawa et al. | 2002/0014257 A1 | 2/2002 | Chandra et al. ............. 134/19 |
| 6,077,321 | A | 6/2000 | Adachi et al. | 2002/0046707 A1 | 4/2002 | Biberger et al. |
| 6,082,150 | A | 7/2000 | Stucker | 2002/0189543 A1 | 12/2002 | Biberger et al. |
| 6,085,935 | A | 7/2000 | Malchow et al. | 2003/0005948 A1 | 1/2003 | Matsuno et al. |
| 6,089,377 | A | 7/2000 | Shimizu | 2003/0036023 A1 | 2/2003 | Moreau et al. |
| 6,097,015 | A | 8/2000 | McCullough et al. | 2003/0047199 A1 * | 3/2003 | Worm ........................ 134/33 |
| 6,122,566 | A | 9/2000 | Nguyen et al. | 2003/0051741 A1 | 3/2003 | DeSimone et al. |
| 6,123,510 | A | 9/2000 | Greer et al. | 2003/0081206 A1 | 5/2003 | Doyle ........................ 356/301 |
| 6,128,830 | A | 10/2000 | Bettcher et al. | 2003/0161734 A1 | 8/2003 | Kim |
| 6,145,519 | A | 11/2000 | Konishi et al. | 2003/0196679 A1 | 10/2003 | Cotte et al. |
| 6,159,295 | A | 12/2000 | Maskara et al. | 2003/0205510 A1 | 11/2003 | Jackson |
| 6,164,297 | A | 12/2000 | Kamikawa | 2004/0011386 A1 * | 1/2004 | Seghal ........................ 134/26 |
| 6,186,722 | B1 | 2/2001 | Shirai | 2004/0020518 A1 | 2/2004 | DeYoung et al. |
| 6,203,582 | B1 | 3/2001 | Berner et al. | 2004/0103922 A1 | 6/2004 | Inoue et al. ................. 134/26 |
| 6,216,364 | B1 | 4/2001 | Tanaka et al. | 2004/0118812 A1 | 6/2004 | Watkins et al. .............. 216/83 |
| 6,221,781 | B1 | 4/2001 | Siefering et al. | 2004/0121269 A1 | 6/2004 | Liu et al. .................... 430/329 |
| 6,228,563 | B1 | 5/2001 | Starov et al. | 2004/0134515 A1 | 7/2004 | Castrucci |
| 6,235,634 | B1 | 5/2001 | White et al. | 2004/0157463 A1 | 8/2004 | Jones |
| 6,239,038 | B1 | 5/2001 | Wen | 2004/0168709 A1 | 9/2004 | Drumm et al. ............... 134/18 |
| 6,241,825 | B1 | 6/2001 | Wytman | 2004/0211440 A1 | 10/2004 | Wang et al. .................. 134/2 |
| 6,244,121 | B1 | 6/2001 | Hunter | 2004/0213676 A1 | 10/2004 | Phillips et al. |
| 6,251,250 | B1 | 6/2001 | Keigler | 2004/0255978 A1 * | 12/2004 | Fury et al. .................. 134/18 |
| 6,264,003 | B1 | 7/2001 | Dong et al. .............. 184/104.1 | 2005/0014370 A1 | 1/2005 | Jones |
| 6,264,752 | B1 | 7/2001 | Curtis et al. | 2005/0026547 A1 | 2/2005 | Moore et al. |
| 6,264,753 | B1 | 7/2001 | Chao et al. | 2005/0111987 A1 | 5/2005 | Yoo et al. |
| 6,277,753 | B1 | 8/2001 | Mullee et al. | 2005/0141998 A1 | 6/2005 | Yoo et al. |
| 6,286,231 | B1 | 9/2001 | Bergman et al. | 2005/0158178 A1 | 7/2005 | Yoo et al. |
| 6,305,677 | B1 | 10/2001 | Lenz | 2005/0191184 A1 | 9/2005 | Vinson, Jr. |
| 6,306,564 | B1 | 10/2001 | Mullee | 2005/0199263 A1 * | 9/2005 | Irie et al. |
| 6,333,268 | B1 | 12/2001 | Starov et al. | 2006/0102204 A1 | 5/2006 | Jacobson et al. ............. 134/26 |
| 6,334,266 | B1 | 1/2002 | Moritz | 2006/0102208 A1 | 5/2006 | Jacobson et al. ............. 134/56 |
| 6,344,174 | B1 | 2/2002 | Miller et al. | 2006/0130966 A1 * | 6/2006 | Babic et al. ............. 156/345.1 |
| 6,355,072 | B1 | 3/2002 | Racette et al. | 2006/0180175 A1 | 8/2006 | Parent ........................ 134/1.3 |
| 6,363,292 | B1 | 3/2002 | McLoughlin | | | |
| 6,388,317 | B1 | 5/2002 | Reese | FOREIGN PATENT DOCUMENTS | | |
| 6,389,677 | B1 | 5/2002 | Lenz | DE | 36 08 783 A1 | 9/1987 |
| 6,406,782 | B2 | 6/2002 | Johnson et al. | DE | 198 60 084 A1 | 7/2000 |
| 6,418,956 | B1 | 7/2002 | Bloom | EP | 0 244 951 A2 | 11/1987 |
| 6,436,824 | B1 | 8/2002 | Chooi et al. | EP | 0 272 141 A2 | 6/1988 |
| 6,454,519 | B1 | 9/2002 | Toshima et al. | EP | 0 453 867 A1 | 10/1991 |
| 6,454,945 | B1 | 9/2002 | Weigl et al. | EP | 0 572 913 A1 | 12/1993 |
| 6,464,790 | B1 | 10/2002 | Sherstinsky et al. | EP | 0 587 168 A1 | 3/1994 |
| 6,497,239 | B2 | 12/2002 | Farmer et al. | EP | 0 679 753 B1 | 11/1995 |
| 6,508,259 | B1 | 1/2003 | Tseronis et al. ............ 134/105 | EP | 0 726 099 A2 | 8/1996 |
| 6,509,141 | B2 | 1/2003 | Mullee ........................ 430/329 | EP | 0 903 775 A2 | 3/1999 |
| 6,521,466 | B1 | 2/2003 | Castrucci | FR | 1.499.491 | 9/1967 |
| 6,541,278 | B2 | 4/2003 | Morita et al. | GB | 2 003 975 | 3/1979 |
| 6,546,946 | B2 | 4/2003 | Dunmire | GB | 2 193 482 | 2/1988 |
| 6,550,484 | B1 | 4/2003 | Gopinath et al. | JP | 56-142629 | 11/1981 |
| 6,558,475 | B1 | 5/2003 | Jur et al. | JP | 60-238479 | 11/1985 |
| 6,561,213 | B2 | 5/2003 | Wang et al. | JP | 60-246635 | 12/1985 |
| 6,561,220 | B2 | 5/2003 | McCullough et al. | JP | 61-017151 | 1/1986 |
| 6,561,481 | B1 | 5/2003 | Filonczuk | JP | 61-231166 | 10/1986 |
| 6,561,767 | B2 | 5/2003 | Biberger et al. | JP | 62-111442 | 5/1987 |
| 6,564,826 | B2 | 5/2003 | Shen | JP | 62-125619 | 6/1987 |
| 6,596,093 | B2 | 7/2003 | DeYoung et al. | JP | 63-179530 | 7/1988 |
| 6,612,317 | B2 | 9/2003 | Costantini et al. | JP | 63-256326 | 10/1988 |
| 6,616,414 | B2 | 9/2003 | Yoo et al. | JP | 63-303059 | 12/1988 |
| 6,641,678 | B2 | 11/2003 | DeYoung et al. | JP | 2-148841 | 6/1990 |
| 6,722,642 | B1 | 4/2004 | Sutton et al. | JP | 2-209729 | 8/1990 |
| 6,736,149 | B2 | 5/2004 | Biberger et al. | JP | 2-122520 | 10/1990 |
| 6,764,212 | B1 | 7/2004 | Nitta et al. ................. 366/114 | JP | 03-080537 | 4/1991 |
| 6,764,552 | B1 | 7/2004 | Joyce et al. | JP | 4-17333 | 1/1992 |
| 6,805,801 | B1 | 10/2004 | Humayun et al. | JP | 4-284648 | 10/1992 |
| 6,815,922 | B2 | 11/2004 | Yoo et al. | JP | 5-283511 | 10/1993 |
| 6,817,368 | B2 | 11/2004 | Toshima et al. ............ 134/95.3 | JP | 7-24679 | 3/1995 |
| 6,851,148 | B2 | 2/2005 | Preston et al. | | | |

| | | |
|---|---|---|
| JP | 7-283104 | 10/1995 |
| JP | 8-186140 | 7/1996 |
| JP | 8-252549 | 10/1996 |
| JP | 8-306632 | 11/1996 |
| JP | 9-43857 | 2/1997 |
| JP | 10-144757 | 5/1998 |
| JP | 10-260537 | 9/1998 |
| JP | 10-335408 | 12/1998 |
| JP | 11-200035 | 7/1999 |
| JP | 11-204514 | 7/1999 |
| JP | 11-260809 | 9/1999 |
| JP | 11-274132 | 10/1999 |
| JP | 2000-106358 | 4/2000 |
| JP | 2001/77074 | 3/2001 |
| SE | 251213 | 8/1948 |
| WO | WO 87/07309 | 12/1987 |
| WO | WO 91/12629 | 8/1991 |
| WO | WO 99/18603 | 4/1999 |
| WO | WO 00/36635 | 6/2000 |
| WO | WO 01/10733 A1 | 2/2001 |
| WO | WO 01/33615 A3 | 5/2001 |
| WO | WO 01/55628 A1 | 8/2001 |
| WO | WO 01/68279 A2 | 9/2001 |
| WO | WO 01/74538 A1 | 10/2001 |
| WO | WO 01/78911 A1 | 10/2001 |
| WO | WO 01/85391 A2 | 11/2001 |
| WO | WO 01/94782 A3 | 12/2001 |
| WO | WO 02/09147 A2 | 1/2002 |
| WO | WO 02/16051 A2 | 2/2002 |
| WO | WO 02/084709 A2 | 10/2002 |
| WO | WO 03/030219 A2 | 10/2003 |

OTHER PUBLICATIONS

Sun, Y.P. et al., "Preparation of Polymer-Protected Semiconductor Nanoparticles Through the Rapid Expansion of Supercritical Fluid Solution," Chemical Physics Letters, pp. 585-588, May 22, 1998.

Dahmen, N. et al., "Supercritical Fluid Extraction of Grinding and Metal Cutting Waste Contaminated with Oils," Supercritical Fluids—Extraction and Pollution Prevention, ACS Symposium Series, vol. 670, pp. 270-279, Oct. 21, 1997.

Xu, C. et al., "Submicron-Sized Spherical Yttrium Oxide Based Phosphors Prepared by Supercritical CO2-Assisted aerosolization and pyrolysis," Appl. Phys. Lett., vol. 71, No. 12, Sep. 22, 1997, pp. 1643-1645.

Courtecuisse, V.G. et al., "Kinetics of the Titanium Isopropoxide Decomposition in Supercritical Isopropyl Alcohol," Ind. Eng. Chem. Res., vol. 35, No. 8, pp. 2539-2545, Aug. 1996.

Gallagher-Wetmore, P. et al., "Supercritical Fluid Processing: A New Dry Technique for Photoresist Developing," SPIE vol. 2438, pp. 694-708, Jun. 1995.

McHardy, J. et al., "Progress in Supercritical CO2 Cleaning," SAMPE Jour., vol. 29, No. 5, pp. 20-27, Sep. 1993.

Purtell, R, et al., "Precision Parts Cleaning Using Supercritical Fluids," J. Vac, Sci, Technol. A. vol. 11, No. 4, Jul. 1993, pp. 1696-1701.

Hansen, B.N. et al., "Supercritical Fluid Transport—Chemical Deposition of Films," Chem. Mater., vol. 4, No. 4, pp. 749-752, 1992.

Hybertson, B.M. et al., "Deposition of Palladium Films by a Novel Supercritical Fluid Transport Chemical Deposition Process," Mat. Res. Bull., vol. 26, pp. 1127-1133, 1991.

Ziger, D. H. et al., "Compressed Fluid Technology: Application to RIE-Developed Resists," AiChE Jour., vol. 33, No. 10, pp. 1585-1591, Oct. 1987.

Matson, D.W. et al., "Rapid Expansion of Supercritical Fluids Solutions: Solute Formation of Powders, Thin Films, and Fibers," Ind. Eng. Chem. Res., vol. 26, No. 11, pp. 2298-2306, 1987.

Tolley, W.K. et al., "Stripping Organics from Metal and Mineral Surfaces using Supercritical Fluids," Separation Science and Technology, vol. 22, pp. 1087-1101, 1987.

Joseph L. Foszcz, "Diaphragm Pumps Eliminate Seal Problems", Plant Engineering, pp. 1-5, Feb. 1, 1996.

Bob Agnew, "Wilden Air-Operated Diaphram Pumps", Process & Industrial Training Technologies, Inc., 1996.

* cited by examiner

PROCESS FLOW THERMOCOUPLE

CROSS-REFERENCE TO RELATED APPLICATIONS

This patent application is related to commonly owned co-pending U.S. patent application Ser. No. 11/065,636, filed Feb. 23, 2005, entitled "IMPROVED RINSING STEP IN SUPERCRITICAL PROCESSING", U.S. patent application Ser. No. 11/065,377, filed Feb. 23, 2005, entitled "IMPROVED CLEANING STEP IN SUPERCRITICAL PROCESSING", U.S. patent application Ser. No. 11/065,376, filed Feb. 23, 2005, entitled "ETCHING AND CLEANING BPSG MATERIAL USING SUPERCR1TICAL PROCESSING", and U.S. patent application Ser. No. 11/091,976, filed Mar. 28, 2005, entitled "HIGH PRESSURE FOURIER TRANSFORM INFRARED CELL", which are hereby incorporated by reference in its entirety.

FIELD OF THE INVENTION

This invention relates to a sensor assembly for measuring the temperature of a fluid. This invention is particularly suited for use in accurately measuring the temperature of process fluids confined to process tubing such as supercritical fluids.

BACKGROUND OF THE INVENTION

Typically, when the temperature of a process fluid flowing in process tubing needs to be automatically measured, a thermocouple is used. To improve the accuracy of the measurement, the thermocouple is placed as close as possible to the fluid. However, the thermocouple is placed external to the tubing because there are electrical leads attached to the probe that need to be easily accessible in order to read the temperature measurement. Since the thermocouple is not physically in contact with the fluid, the reaction time is too slow and the measured temperature is not accurate.

One method used in the past to increase the reaction time is to machine a thin-walled depression into the wall of a fitting, such as a T-shaped fitting. Potting compound is then used to firmly hold a thermocouple in the depression. In this configuration, the thermocouple still does not make contact with the fluid, however the reaction time is decreased since the thermocouple is surrounded on three sides by the fluid, and the potting compound is chosen to be thermally conductive. Unfortunately, the depression in the fitting is expensive to machine. Also, it is also difficult to remove and replace the thermocouple should the thermocouple fail.

Using a bayonet-type spring-loaded thermocouple facilitates removal and replacement of the sensor. But this type of thermocouple is difficult to place close to the process fluid and consequently, has a slow reaction time when sensing changes in the temperature of the flow. This device also requires manufacturing an expensive thermal-weld in which to install the thermocouple.

VCR fittings are commonly used in fluid and gas flow systems. A typical assembly will usually comprise two glands engaging and sealing on either side of a gasket, held together by connecting male and female nuts; or a gland engaging and sealing on one side of a gasket and a connector body engaging and sealing on the other side of the gasket, secured by a nut. One approach to the current problem designed for use with VCR components is to thread a thermocouple through the gasket and weld the gasket to the sheath of the thermocouple. However, the drawback to this design is that the thermocouple is not reusable, and thus it cannot be cleaned.

What is needed is a thermocouple probe design that can react quickly and accurately to temperature changes and is easily removable and replaceable.

SUMMARY OF THE INVENTION

The present invention is a device which enables accurate temperature measurements of a process fluid which is flowing in a system of process tubing. A thermocouple typically has sensor leads attached to the sensor probe, and the sensor probe is enclosed in a sheath. Ideally, the sensor probe is placed directly in the environment in which the temperature is to be measured, while the sensor leads are accessible to read the measured temperature. However, when the temperature to be measured is that of a fluid flowing within tubing, it is difficult to get access to the fluid. If the sensor is not in direct contact with the fluid, the reaction time is slow.

This invention plugs and seals the opening of a metal sleeve by thermal welding the entire circumference of the thermocouple sheath to the inside of the sleeve. The sleeve has a sealing face on the end closest to which the sensor is located. This sealing face allows the sleeve to seal to other sleeves or fittings which are, in turn, welded to process tubing. Since the thermocouple plugs up the metal sleeve, once the sleeve is sealed to another sleeve which is further connected to tubing, the sensor is sealed inside the area enclosed by the tubing and sleeve. Thus, when the fluid flows in the tubing, the sensor makes direct contact with the fluid. Contact between the sensor and the fluid results in accurate and rapid detection of the fluid's temperature. Off-the-shelf sleeves with reliable seals are readily available. One popular design is a VCR gland which employs a raised half-torus as the sealing surface. Alternatively, a single piece unit comprised of the thermocouple sheath geometry and the sleeve with sealing geometry could be realized, for example, machined from a single piece of material. Other types of seal geometries the design could embody would be VCO (o-ring type face seal) and Lapped-Joint sealing surfaces.

This invention is not limited to thermocouple probes that measure temperature. It is suitable for use with any type of probe that measures a characteristic of the fluid or gas flowing in process tubing where it would be advantageous to have the probe sitting directly in the flow and where the leads to the probe are required to be easily accessible in order to read the measurement. Furthermore it is not limited to high pressure environments, and would be suitable for use at ambient pressure or at low pressure or under high vacuum.

BRIEF DESCRIPTION OF THE DRAWINGS

A more complete appreciation of various embodiments of the invention and many of the attendant advantages thereof will become readily apparent with reference to the following detailed description, particularly when considered in conjunction with the accompanying drawings, in which.

DETAILED DESCRIPTION OF SEVERAL EMBODIMENTS

Embodiments of the present invention disclose a sensor assembly that enables in situ monitoring of the temperature of a high-pressure processing fluid/solution enclosed within a closed loop environment. The closed loop environment is preferably under high pressure. In the preferred embodiment, the high-pressure system can exceed 3,000 psi.

Figure 1:
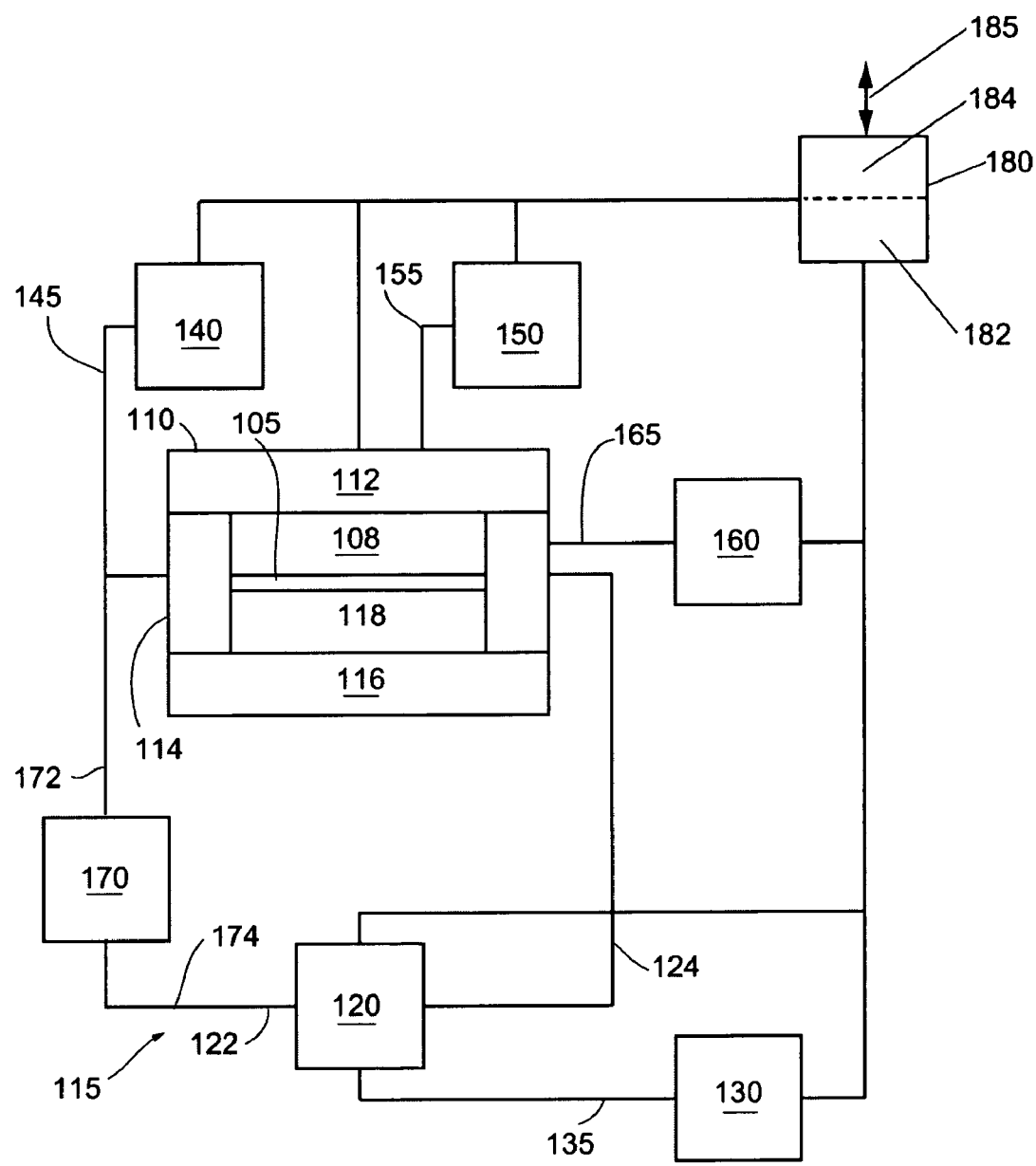
FIG. 1 shows an exemplary block diagram of a processing system in accordance with embodiments of the invention.

FIG. 1 shows an exemplary block diagram of a processing system in accordance with an embodiment of the invention. In the illustrated embodiment, processing system 100 comprises a process module 110, a recirculation system 120, a process chemistry supply system 130, a high-pressure fluid supply system 140, an exhaust control system 150, a pressure control system 160, a sensor assembly 170, and a controller 180. The processing system 100 can operate at pressures that can range from 1000 psi. to 10,000 psi. In addition, the processing system 100 can operate at temperatures that can range from 40 to 300 degrees Celsius.

The details concerning one example of a processing chamber are disclosed in co-owned and co-pending U.S. patent applications, Ser. No. 09/912,844, entitled "HIGH PRESSURE PROCESSING CHAMBER FOR SEMICONDUCTOR SUBSTRATE," filed Jul. 24, 2001, U.S. Ser. No. 09/970,309, entitled "HIGH PRESSURE PROCESSING CHAMBER FOR MULTIPLE SEMICONDUCTOR SUBSTRATES," filed Oct. 3, 2001, U.S. Ser. No. 10/121,791, entitled "HIGH PRESSURE PROCESSING CHAMBER FOR SEMICONDUCTOR SUBSTRATE INCLUDING FLOW ENHANCING FEATURES," filed Apr. 10, 2002, and U.S. Ser. No. 10/364,284, entitled "HIGH-PRESSURE PROCESSING CHAMBER FOR A SEMICONDUCTOR WAFER," filed Feb. 10, 2003, the contents of which are incorporated herein by reference.

The controller 180 can be coupled to the process module 110, the recirculation system 120, the process chemistry supply system 130, the high-pressure fluid supply system 140, the exhaust control system, the pressure control system 160, and the sensor assembly 170. Alternately, controller 180 can be coupled to one or more additional controllers/computers (not shown), and controller 180 can obtain setup, configuration, and/or recipe information from an additional controller/computer.

In FIG. 1, singular processing elements (110, 120, 130, 140, 150, 160, 170, and 180) are shown, but this is not required for the invention. The semiconductor processing system 100 can comprise any number of processing elements having any number of controllers associated with them in addition to independent processing elements.

The controller 180 can be used to configure any number of processing elements (110, 120, 130, 140, 150, 160, and 170), and the controller 180 can collect, provide, process, store, and display data from processing elements. The controller 180 can comprise a number of applications for controlling one or more of the processing elements. For example, controller 180 can include a GUI component (not shown) that can provide easy to use interfaces that enable a user to monitor and/or control one or more processing elements.

The process module 110 can include an upper assembly 112 and a lower assembly 116, and the upper assembly 112 can be coupled to the lower assembly 116. In an alternate embodiment, a frame and or injection ring may be included and may be coupled to an upper assembly and a lower assembly. The upper assembly 112 can comprise a heater (not shown) for heating the process chamber, the substrate, or the processing fluid, or a combination of two or more thereof. Alternately, a heater is not required in the upper assembly 112. In another embodiment, the lower assembly 116 can comprise a heater (not shown) for heating the process chamber, the substrate, or the processing fluid, or a combination of two or more thereof. The process module 110 can include means for flowing a processing fluid through the processing chamber 108. In one example, a circular flow pattern can be established, and in another example, a substantially linear flow pattern can be established. Alternately, the means for flowing can be configured differently. The lower assembly 116 can comprise one or more lifters (not shown) for moving the chuck 118 and/or the substrate 105. Alternately, a lifter is not required.

In one embodiment, the process module 110 can include a holder or chuck 118 for supporting and holding the substrate 105 while processing the substrate 105. The holder or chuck 118 can also be configured to heat or cool the substrate 105 before, during, and/or after processing the substrate 105. Alternately, the process module 110 can include a platen for supporting and holding the substrate 105 while processing the substrate 105.

A transfer system (not shown) can be used to move a substrate into and out of the processing chamber 108 through a slot (not shown). In one example, the slot can be opened and closed by moving the chuck, and in another example, the slot can be controlled using a gate valve.

The substrate can include semiconductor material, metallic material, dielectric material, ceramic material, or polymer material, or a combination of two or more thereof. The semiconductor material can include Si, Ge, Si/Ge, or GaAs. The metallic material can include Cu, Al, Ni, Pb, Ti, Ta, or W, or combinations of two or more thereof. The dielectric material can include Si, O, N, H, P, or C, or combinations of two or more thereof. The ceramic material can include Al, N, Si, C, or O, or combinations of two or more thereof.

In one embodiment, the recirculation system can be coupled to the process module 110 using one or more inlet lines 122 and one or more outlet lines 124, and a recirculation loop 115 can be configured that includes a portion of the recirculation system, a portion of the process module 110, one or more of the inlet lines 122, and one or more of the outlet lines 124. In one embodiment, the recirculation loop 115 comprises a volume of approximately one liter. In alternate embodiments, the volume of the recirculation loop 115 can vary from approximately 0.5 liters to approximately 2.5 liters.

The recirculation system 120 can comprise one or more pumps (not shown) that can be used to regulate the flow of the supercritical processing solution through the processing chamber 108 and the other elements in the recirculation loop 115. The flow rate can vary from approximately 0.01 liters/minute to approximately 100 liters/minute.

The recirculation system 120 can comprise one or more valves (not shown) for regulating the flow of a supercritical processing solution through the recirculation loop 115. For example, the recirculation system 120 can comprise any number of back-flow valves, filters, pumps, and/or heaters (not shown) for maintaining a supercritical processing solution and flowing the supercritical process solution through the recirculation system 120 and through the processing chamber 108 in the process module 110.

Processing system 100 can comprise a process chemistry supply system 130. In the illustrated embodiment, the process chemistry supply system is coupled to the recirculation system 120 using one or more lines 135, but this is not required for the invention. In alternate embodiments, the process chemistry supply system can be configured differently and can be coupled to different elements in the processing system.

The process chemistry is introduced by the process chemistry supply system 130 into the fluid introduced by the high-pressure fluid supply system 140 at ratios that vary with the substrate properties, the chemistry being used, and the process being performed in the processing chamber 110. The ratio can vary from approximately 0.001 to approximately 15 percent by volume. For example, when the recirculation loop 115 comprises a volume of about one liter, the process chemistry volumes can range from approximately ten micro liters to approximately one hundred fifty milliliters. In alternate embodiments, the volume and/or the ratio may be higher or lower.

The process chemistry supply system 130 can comprise a cleaning chemistry assembly (not shown) for providing cleaning chemistry for generating supercritical cleaning solutions within the processing chamber. The cleaning chemistry can include peroxides and a fluoride source. For example, the peroxides can include hydrogen peroxide, benzoyl peroxide, or any other suitable peroxide, and the fluoride sources can include fluoride salts (such as ammonium fluoride salts), hydrogen fluoride, fluoride adducts (such as organic-ammonium fluoride adducts) and combinations thereof.

Further details of fluoride sources and methods of generating supercritical processing solutions with fluoride sources are described in U.S. patent application Ser. No. 10/442,557, filed May 10, 2003, and titled "TETRA-ORGANIC AMMONIUM FLUORIDE AND HF IN SUPERCRITICAL FLUID FOR PHOTORESIST AND RESIDUE REMOVAL", and U.S. patent application Ser. No. 10/321,341, filed Dec. 16, 2002, and titled "FLUORIDE IN SUPERCRITICAL FLUID FOR PHOTORESIST POLYMER AND RESIDUE REMOVAL," both are incorporated by reference herein.

In addition, the cleaning chemistry can include chelating agents, complexing agents, oxidants, organic acids, and inorganic acids that can be introduced into supercritical carbon dioxide with one or more carrier solvents, such as N,N-dimethylacetamide (DMAc), gamma-butyrolactone (BLO), dimethyl sulfoxide (DMSO), ethylene carbonate (EC), N-methylpyrrolidone (NMP), dimethylpiperidone, propylene carbonate, and alcohols (such a methanol, ethanol and 1-propanol).

Furthermore, the cleaning chemistry can include solvents, co-solvents, surfactants, and/or other ingredients. Examples of solvents, co-solvents, and surfactants are disclosed in co-owned U.S. Pat. No. 6,500,605, entitled "REMOVAL OF PHOTORESIST AND RESIDUE FROM SUBSTRATE USING SUPERCRITICAL CARBON DIOXIDE PROCESS", issued Dec. 31, 2002, and U.S. Pat. No. 6,277,753, entitled "REMOVAL OF CMP RESIDUE FROM SEMICONDUCTORS USING SUPERCRITICAL CARBON DIOXIDE PROCESS", issued Aug. 21, 2001, both are incorporated by reference herein.

The process chemistry supply system 130 can be configured to introduce N-methyl pyrrolidone (NMP), diglycol amine, hydroxyl amine, di-isopropyl amine, tri-isoprpyl amine, tertiary amines, catechol, ammonium fluoride, ammonium bifluoride, methylacetoacetamide, ozone, propylene glycol monoethyl ether acetate, acetylacetone, dibasic esters, ethyl lactate, $CHF_3$, $BF_3$, HF, other fluorine containing chemicals, or any mixture thereof. Other chemicals such as organic solvents may be utilized independently or in conjunction with the above chemicals to remove organic materials. The organic solvents may include, for example, an alcohol, ether, and/or glycol, such as acetone, diacetone alcohol, dimethyl sulfoxide (DMSO), ethylene glycol, methanol, ethanol, propanol, or isopropanol (IPA). For further details, see U.S. Pat. No. 6,306,564B1, filed May 27, 1998, and titled "REMOVAL OF RESIST OR RESIDUE FROM SEMICONDUCTORS USING SUPERCRITICAL CARBON DIOXIDE", and U.S. Pat. No. 6,509,141B2, filed Sep. 3, 1999, and titled "REMOVAL OF PHOTORESIST AND PHOTORESIST RESIDUE FROM SEMICONDUCTORS USING SUPERCRITICAL CARBON DIOXIDE PROCESS", both are incorporated by reference herein.

Moreover, the process chemistry supply system 130 can be configured to introduce a peroxide during a cleaning and/or rinsing process. The peroxide can be introduced with any one of the above process chemistries, or any mixture thereof. The peroxide can include organic peroxides, or inorganic peroxides, or a combination thereof. For example, organic peroxides can include 2-butanone peroxide; 2,4-pentanedione peroxide; peracetic acid; t-butyl hydroperoxide; benzoyl peroxide; or m-chloroperbenzoic acid (mCPBA). Other peroxides can include hydrogen peroxide. Alternatively, the peroxide can include a diacyl peroxide, such as: decanoyl peroxide; lauroyl peroxide; succinic acid peroxide; or benzoyl peroxide; or any combination thereof. Alternatively, the peroxide can include a dialkyl peroxide, such as: dicumyl peroxide; 2,5-di(t-butylperoxy)-2,5-dimethylhexane; t-butyl cumyl peroxide; α,α-bis(t-butylperoxy) diisopropylbenzene mixture of isomers; di(t-amyl)peroxide; di(t-butyl)peroxide; or 2,5-di(t-butylperoxy)-2,5-dimethyl-3-hexyne; or any combination thereof. Alternatively, the peroxide can include a diperoxyketal, such as: 1,1-di(t-butylperoxy)-3,3,5-trimethylcyclohexane; 1,1-di(t-butylperoxy)cyclohexane; 1,1-di(t-amylperoxy)-cyclohexane; n-butyl 4,4-di(t-butylperoxy)valerate; ethyl 3,3-di(t-amylperoxy)butanoate; t-butyl peroxy-2-ethylhexanoate; or ethyl 3,3-di(t-butylperoxy)butyrate; or any combination thereof. Alternatively, the peroxide can include a hydroperoxide, such as: cumene hydroperoxide; or t-butyl hydroperoxide; or any combination thereof. Alternatively, the peroxide can include a ketone peroxide, such as: methyl ethyl ketone peroxide; or 2,4-pentanedione peroxide; or any combination thereof. Alternatively, the peroxide can include a peroxydicarbonate, such as: di(n-propyl)peroxydicarbonate; di(sec-butyl)peroxydicarbonate; or di(2-ethylhexyl)peroxydicarbonate; or any combination thereof. Alternatively, the peroxide can include a peroxyester, such as: 3-hydroxyl-1,1-dimethylbutyl peroxyneodecanoate; α-cumyl peroxyneodecanoate; t-amyl peroxyneodecanoate; t-butyl peroxyneodecanoate; t-butyl peroxypivalate; 2,5-di(2-ethylhexanoylperoxy)-2,5-dimethylhexane; t-amyl peroxy-2-ethylhexanoate; t-butyl peroxy-2-ethylhexanoate; t-amyl peroxyacetate; t-butyl peroxyacetate; t-butyl peroxybenzoate; OO-(t-amyl) O-(2-ethylhexyl)monoperoxycarbonate; OO-(t-butyl) O-isopropyl monoperoxycarbonate; OO-(t-butyl) O-(2-ethylhexyl)monoperoxycarbonate; polyether poly-t-butylperoxy carbonate; or t-butyl peroxy-3,5,5-trimethyl-hexanoate; or any combination thereof. Alternatively, the peroxide can include any combination of peroxides listed above.

The process chemistry supply system 130 can comprise a rinsing chemistry assembly (not shown) for providing rinsing chemistry for generating supercritical rinsing solutions within the processing chamber. The rinsing chemistry can include one or more organic solvents including, but not limited to, alcohols and ketones. For example, the rinsing chemistry can comprise solvents, such as N,N-dimethylacetamide (DMAc), gamma-butyrolactone (BLO), dimethyl sulfoxide (DMSO), ethylene carbonate (EC), N-methylpyrrolidone (NMP), dimethylpiperidone, propylene carbonate, and alcohols (such a methanol, ethanol and 2-propanol).

Moreover, the process chemistry supply system 130 can be configured to introduce treating chemistry for curing, cleaning, healing (or restoring the dielectric constant of low-k materials), or sealing, or any combination), low dielectric constant films (porous or non-porous). The chemistry can include hexamethyldisilazane (HMDS), chlorotrimethylsilane (TMCS), trichloromethylsilane (TCMS), dimethylsilyldiethylamine (DMSDEA), tetramethyldisilazane (TMDS), trimethylsilyldimethylamine (TMSDMA), dimethylsilyldimethylamine (DMSDMA), trimethylsilyldiethylamine (TMSDEA), bistrimethylsilyl urea (BTSU), bis(dimethylamino)methyl silane (B[DMA]MS), bis(dimethylamino)dimethyl silane (B[DMA]DS), HMCTS, dimethylaminopentamethyldisilane (DMAPMDS), dimethylaminodimethyidisilane (DMADMDS), disila-aza-cyclopentane (TDACP), disila-oza-cyclopentane (TDOCP), methyltrimethoxysilane (MTMOS), vinyltrimethoxysilane (VTMOS), or trimethylsilylimidazole (TMSI). Additionally, the chemistry may include N-tert-butyl-1,1-dimethyl-1-(2,3,4,5-tetramethyl-2,4-cyclopentadiene-1-yl)silanamine, 1,3-diphenyl-1,1,3,3-tetramethyidisilazane, or tert-butylchlorodiphenylsilane. For further details, see U.S. patent application Ser. No. 10/682,196, filed Oct. 10, 2003, and titled "METHOD AND SYSTEM FOR TREATING A DIELECTRIC FILM", and U.S. patent application Ser. No. 10/379,984, filed Mar. 4, 2003, and titled "METHOD OF PASSIVATING LOW DIELECTRIC MATERIALS IN WAFER PROCESSING", both incorporated by reference herein.

The processing system 100 can comprise a high-pressure fluid supply system 140. As shown in FIG. 1, the high-pressure fluid supply system 140 can be coupled to the recirculation system 120 using one or more lines 145, but this is not required. The inlet line 145 can be equipped with one or more back-flow valves, and/or heaters (not shown) for controlling the fluid flow from the high-pressure fluid supply system 140. In alternate embodiments, high-pressure fluid supply system 140 can be configured differently and coupled differently. For example, the high-pressure fluid supply system 140 can be coupled to the process module 110.

The high-pressure fluid supply system 140 can comprise a carbon dioxide source (not shown) and a plurality of flow control elements (not shown) for generating a supercritical fluid. For example, the carbon dioxide source can include a $CO_2$ feed system, and the flow control elements can include supply lines, valves, filters, pumps, and heaters. The high-pressure fluid supply system 140 can comprise an inlet valve (not shown) that is configured to open and close to allow or prevent the stream of supercritical carbon dioxide from flowing into the processing chamber 108. For example, controller 180 can be used to determine fluid parameters such as pressure, temperature, process time, and flow rate.

The processing system 100 can also comprise a pressure control system 160. As shown in FIG. 1, the pressure control system 160 can be coupled to the process module 110 using one or more lines 165, but this is not required. Line 165 can be equipped with one or more back-flow valves, pumps, and/or heaters (not shown) for controlling the fluid flow to pressure control system 160. In alternate embodiments, pressure control system 160 can be configured differently and coupled differently. For example, the pressure control system 160 can also include one or more pumps (not shown), and a sealing means (not shown) for sealing the processing chamber. In addition, the pressure control system 160 can comprise means for raising and lowering the substrate and/or the chuck.

In addition, the processing system 100 can comprise an exhaust control system 150. Alternately, an exhaust system may not be required. As shown in FIG. 1, the exhaust control system 150 can be coupled to the process module 110 using one or more lines 155, but this is not required. Line 155 can be equipped with one or more back-flow valves, and/or heaters (not shown) for controlling the fluid flow to the exhaust control system 150. In alternate embodiments, exhaust control system 150 can be configured differently and coupled differently. The exhaust control system 150 can include an exhaust gas collection vessel (not shown) and can be used to remove contaminants from the processing fluid. Alternately, the exhaust control system 150 can be used to recycle the processing fluid.

Furthermore, the processing system 100 can comprise a sensor assembly 170. As shown in the illustrated embodiment, the sensor assembly is coupled to a first process line 122a and a second process line 122b. As shown in FIG. 1, sensor assembly 170 is coupled into the recirculation loop 115 between the process module 110 and the recirculation system 120. The sensor assembly 170 can comprise means (not shown) for monitoring the temperature of the fluid flowing in the recirculation loop 115.

In one embodiment, controller 180 can comprise a processor 182 and a memory 184. Memory 184 can be coupled to processor 182, and can be used for storing information and instructions to be executed by processor 182. Alternately, different controller configurations can be used. In addition, controller 180 can comprise a port 185 that can be used to couple processing system 100 to another system (not shown). Furthermore, controller 180 can comprise input and/or output devices (not shown).

In addition, one or more of the processing elements (110,120, 130, 140, 150,160, and 180) may include memory (not shown) for storing information and instructions to be executed during processing and processors for processing information and/or executing instructions. For example, the memory may be used for storing temporary variables or other intermediate information during the execution of instructions by the various processors in the system. One or more of the processing elements can comprise the means for reading data and/or instructions from a computer readable medium. In addition, one or more of the processing elements can comprise the means for writing data and/or instructions to a computer readable medium.

Memory devices can include at least one computer readable medium or memory for holding computer-executable instructions programmed according to the teachings of the invention and for containing data structures, tables, records, or other data described herein.

The processing system 100 can perform a portion or all of the processing steps of the invention in response to the controller 180 executing one or more sequences of one or more computer-executable instructions contained in a memory. Such instructions may be received by the controller from another computer, a computer readable medium, or a network connection.

Stored on any one or on a combination of computer readable media, the present invention includes software for controlling the processing system 100, for driving a device or devices for implementing the invention, and for enabling the processing system 100 to interact with a human user and/or another system, such as a factory system. Such software may include, but is not limited to, device drivers, operating systems, development tools, and applications software. Such computer readable media further includes the computer program product of the present invention for performing all or a portion (if processing is distributed) of the processing performed in implementing the invention.

The term "computer readable medium" as used herein refers to any medium that participates in providing instructions to a processor for execution and/or that participates in storing information before, during, and/or after executing an instruction. A computer readable medium may take many forms, including but not limited to, non-volatile media, volatile media, and transmission media. The term "computer-executable instruction" as used herein refers to any computer code and/or software that can be executed by a processor, that provides instructions to a processor for execution and/or that participates in storing information before, during, and/or after executing an instruction.

Controller 180, processor 182, memory 184 and other processors and memory in other system elements as described thus far can, unless indicated otherwise below, be constituted by components known in the art or constructed according to principles known in the art. The computer readable medium and the computer executable instructions can also, unless indicated otherwise below, be constituted by components known in the art or constructed according to principles known in the art.

Controller 180 can use port 185 to obtain computer code and/or software from another system (not shown), such as a factory system. The computer code and/or software can be used to establish a control hierarchy. For example, the processing system 100 can operate independently, or can be controlled to some degree by a higher-level system (not shown).

The controller 180 can be coupled to one or more sensor assemblies 170 and the controller 180 can obtain data from the sensor assembly 170. Alternately, the controller 180 can exchange data with the sensor assembly 170. The controller 180 can include means for determining a temperature of the processing fluid using data from the sensor assembly 170, means for comparing the temperature to a threshold value, and means for altering the temperature of the processing fluid when the temperature is different from the threshold value. For example, additional cooling can be provided to the fluid in the recirculation loop when the temperature is greater than or equal to the threshold value, and additional heating can be provided to the fluid in the recirculation loop when the temperature is less than the threshold value.

The controller 180 can use data from the sensor assembly 170 to determine when to alter, pause, and/or stop a process. The controller 180 can use the data and operational rules to determine when to change a process and how to change the process, and rules can be used to specify the action taken for normal processing and the actions taken on exceptional conditions. Operational rules can be used to determine which processes are monitored and which data is used. For example, rules can be used to determine how to manage the data when a process is changed, paused, and/or stopped. In general, rules allow system and/or tool operation to change based on the dynamic state of the system.

Controller 180 can receive, send, use, and/or generate pre-process data, process data, and post-process data, and this data can include lot data, batch data, run data, composition data, and history data. Pre-process data can be associated with an incoming substrate and can be used to establish an input state for a substrate and/or a current state for a process module. Process data can include process parameters. Post processing data can be associated with a processed substrate and can be used to establish an output state for a substrate The controller 180 can use the pre-process data to predict,-select, or calculate a process recipe to use to process the substrate. A process recipe can include a multi-step process involving a set of process modules. Post-process data can be obtained at some point after the substrate has been processed. For example, post-process data can be obtained after a time delay that can vary from minutes to days.

In one embodiment, the controller 180 can compute a predicted fluid temperature based on the pre-process data, the process characteristics, and a process model. A process model can provide the relationship between one or more process recipe parameters, such as the temperature of the processing fluid and one or more process results. The controller 180 can compare the predicted value to the measured value obtained from the sensor assembly 170 to determine when to alter, pause, and/or stop a process.

In other embodiments, a reaction rate model can be used along with an expected fluid temperature at the substrate surface to compute a predicted value for the processing time, or a solubility model can be used along with an expected fluid temperature at the substrate surface to compute a predicted value for the processing time.

In another embodiment, the controller 180 can use historical data and/or process models to compute an expected value for the temperature of the fluid at various times during the process. The controller 180 can compare an expected temperature value to a measured temperature value to determine when to alter, pause, and/or stop a process.

In a supercritical cleaning/rinsing process, the desired process result can be a process result that is measurable using an optical measuring device, such as a SEM and/or TEM. For example, the desired process result can be an amount of residue and/or contaminant in a via or on the surface of a substrate. After one or more cleaning process run, the desired process can be measured.

In addition, at least one of the processing elements (110, 120, 130, 140, 150, 160, 170, and 180) can comprise a GUI component and/or a database component (not shown). In alternate embodiments, the GUI component and/or the database component may not be required.

It will be appreciated that the controller 180 can perform other functions in addition to those discussed here. The controller 180 can monitor variables associated with the other components in the processing system 100 and take actions based on these variables. For example, the controller 180 can process these variables, display these variables and/or results on a GUI screen, determine a fault condition, determine a response to a fault condition, and alert an operator.

Figure 2:
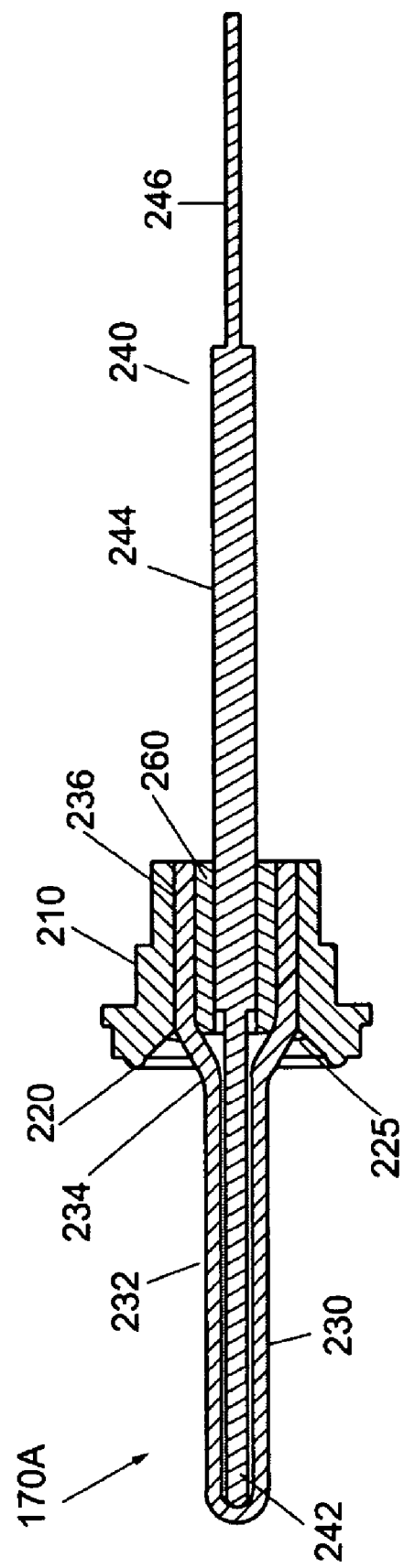
FIG. 2 shows a cross-section of a sensor assembly in accordance with an embodiment of the invention.

FIG. 2 shows a cross-section of a sensor assembly in accordance with an embodiment of the invention. In the illustrated embodiment, the sensor assembly 170A comprises a sensor subassembly 240 that includes a protective sheath 230, a sensor 242, a body 244 coupled to the sensor, and a lead portion 246 coupled to the body. The lead portion can include means for making an electrical connection. For example, wire leads can be provided. Alternately, pins and/or socket arrangements may be provided. The body can be used to couple the lead portion to the sensor.

The protective sheath 230 can comprise a tip portion 232, a transition portion 234 coupled to the tip portion 232, and an annular ring portion 236 coupled to the transition portion 234. For example, the sensor 242 can be mounted within the tip portion 232 of the protective sheath 230, and the body 244 can be mounted within the transition portion 234 of the protective sheath 230. The dimensions of the protective sheath can be dependent on the application. In one embodiment, the length of the tip portion can vary from approximately ten millimeters to approximately fifty millimeters, and the outside diameter of the tip portion can vary from approximately two millimeters to approximately ten millimeters.

The sensor can comprise a temperature sensor that can include a thermocouple, a temperature-indicating resistor, a radiation type temperature sensor, a thermistor, a thermometer, a pyrometer, a micro-electromechanical (MEM) device, or a resistance temperature detector (RTD), or a combination thereof. The sensor can include a contact-type sensor or a non-contact sensor. For example, a K-type thermocouple, a Pt sensor, a bimetallic thermocouple, or a temperature indicating platinum resistor may be used.

The sensor assembly 170A comprises a gland 210 that is coupled to the protective sheath 230. Gland 210 can be a standard VCR gland. The dimensions for the annular ring portion 236 can be dependent on the size of the VCR gland that is used. The gland 210 can encircle the annular ring portion 236 of the protective sheath 230. The gland 210 can be shorter than the protective sheath 230 so that the tip portion 232 extends from one end of the gland 210. The gland 210 and the protective sheath 230 are both made out of a material that is suitable for welding, preferably stainless steel 316L. In one embodiment, the gland 210 is thermal-welded circumferentially 225 to the protective sheath 230, thus the protective sheath 230 and the weld 225 act as a blocking element within the gland 210. The gland 210 also has a sealing surface 220 on one end, preferably in the shape of a raised annular ring. The sealing surface 220 of the gland 210 typically engages one side of a flat metal gasket (not shown) and the other side of the gasket usually engages and seals to a similar gland or a fitting.

In one embodiment, a potting compound 260 can be used to couple the sensor subassembly 240 to the inside portion of the protective sheath 230. Potting compound 260 and/or the material used for the body 244 can provide isolation and/or strain relief for the lead portion. Alternately, other coupling methods may be used.

Figure 3:
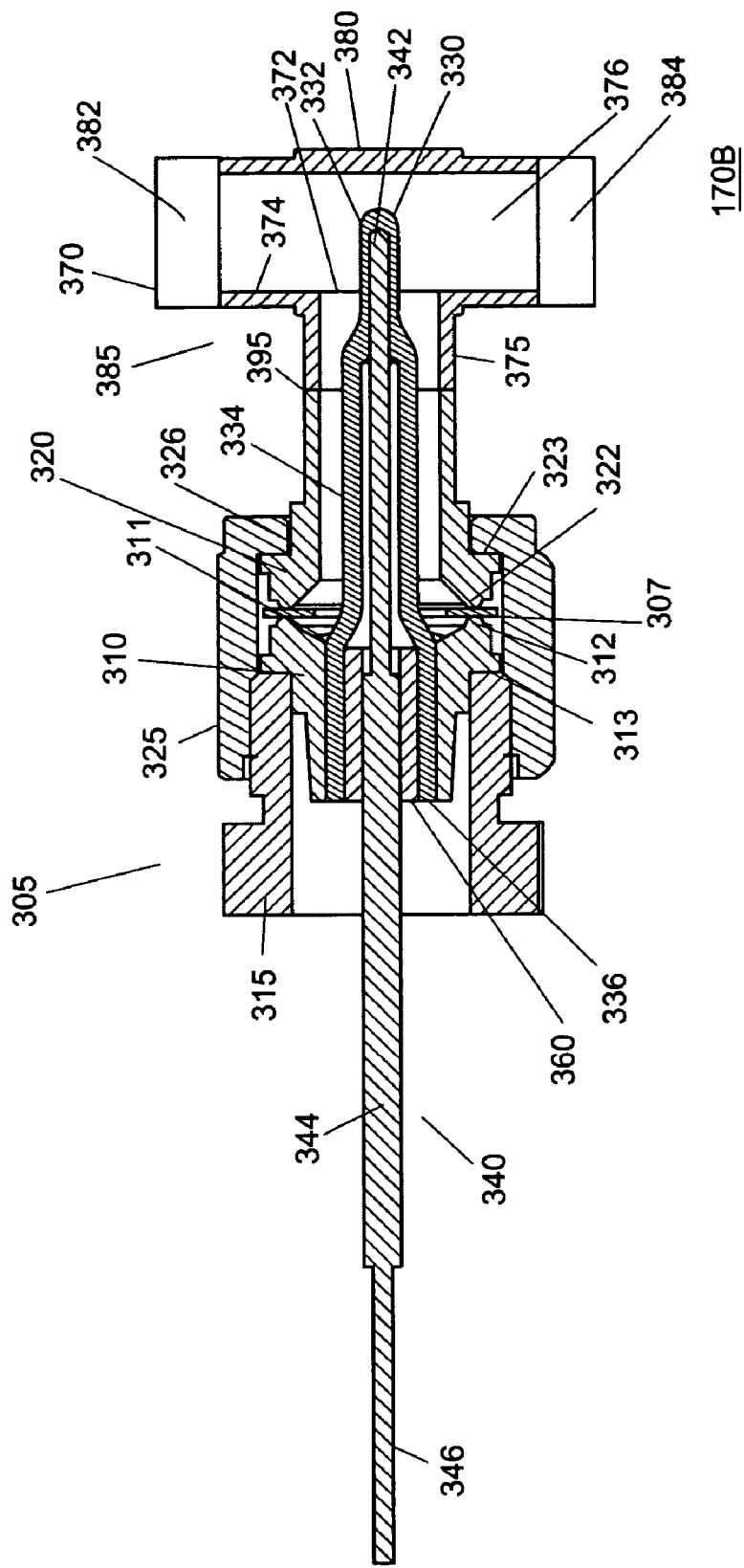
FIG. 3 shows a cross-section of a sensor assembly in accordance with another embodiment of the invention.

FIG. 3 shows a cross-section of a sensor assembly in accordance with another embodiment of the invention. In the illustrated embodiment, the sensor assembly 170B comprises a sensor subassembly 340 that includes a protective sheath 330, a sensor 342, a body 344 coupled to the sensor, and a lead portion 346 coupled to the body. The lead portion can include means for making an electrical connection. For example, wire leads can be provided. Alternately, pins and/or socket arrangements may be provided. The body can be used to couple the lead portion to the sensor.

The protective sheath 330 can comprise a tip portion 332, a transition portion 334 coupled to the tip portion 332, and an annular ring portion 336 coupled to the transition portion 334. For example, the sensor 342 can be mounted within the tip portion 332 of the protective sheath 330, and the body 344 can be mounted within the transition portion 334 of the protective sheath 330. The dimensions of the protective sheath can be dependent on the application. In one embodiment, the length of the tip portion can vary from approximately ten millimeters to approximately fifty millimeters, and the outside diameter of the tip portion can vary from approximately two millimeters to approximately ten millimeters.

The sensor can comprise a temperature sensor that can include a thermocouple, a temperature-indicating resistor, a radiation type temperature sensor, a thermistor, a thermometer, a pyrometer, a micro-electromechanical (MEM) device, or a resistance temperature detector (RTD), or a combination thereof. The sensor can include a contact-type sensor or a non-contact sensor. For example, a K-type thermocouple, a Pt sensor, a bimetallic thermocouple, or a temperature indicating platinum resistor may be used.

In the illustrated embodiment, the sensor assembly 170B comprises a coupling assembly 305 that can be coupled to the protective sheath 330. The coupling assembly 305 can include a gasket 307, a first gland 310, a first nut 315, a second gland 320, and a second nut 325. The coupling assembly comprises a number of parts that can be easily assembled and/or disassembled. For example, the first gland 310 and/or the second gland 320 can be standard VCR glands.

The sealing end of the first gland 310 has a sealing surface in the shape of a raised annular ring 312 that can engage one side of gasket 307. In addition, the sealing end of the second gland 320 has a sealing surface in the shape of a raised annular ring 322 that can engage the other side of gasket 307. The first gland 310 encircles the protective sheath 330 that envelops the sensor subassembly 340; the first gland 310 and the protective sheath 330 are thermal-welded together circumferentially 311.

In one embodiment, the gland assembly 305 can also comprise a first nut 315 and a second nut 325. The first nut 315 has external threads and can be coupled to a mating surface 313 on the first gland 310. The second nut 325 has internal threads and a lip 326 that can be coupled to a mating surface 323 on the second gland 320. When the first nut 315 and the second nut 325 are engaged, the first gland 310 and the second gland 320 are engaged and sealed against the faces of gasket 307. Sealing the two glands 310 and 320 to gasket 307 prevents process fluid from leaking out. During maintenance and/or cleaning operations, the first nut 315 and the second nut 325 can be disengaged and the sensor subassembly 340 can be cleaned and/or replaced. In alternate embodiments, other coupling assemblies may be used.

In one embodiment, a potting compound 360 can be used to couple the sensor subassembly 340 to the inside portion of the protective sheath 330. Potting compound 360 and/or the material used for the body 344 can provide isolation and/or strain relief for the lead portion. Alternately, other coupling methods may be used.

Furthermore, the sensor assembly 170B can also comprise a flow assembly 370 that can include a T-shaped fitting 380 having a first section 375 coupled to the gland assembly 310 and a second section 385 that can be used to couple the sensor assembly 170B into a high-pressure recirculation loop 115 (FIG. 1). The flow assembly 370 can comprise an inlet element 382 and a outlet element 384 that can be used to couple the sensor assembly 170B to flow pipes (not shown) in the high-pressure recirculation loop 115 (FIG. 1). For example, the inlet element 382 and the outlet element 384 can include high-pressure connectors. Alternately, the inlet element 382 and a outlet element 384 may include means for welding the sensor assembly 170B to flow pipes.

In one embodiment, the gland assembly 305 can be welded 395 to the flow assembly 370. For example, the second gland 320 can be welded to the first section 375 of the T-shaped fitting 380. Alternately, the second gland 320 may be connected to the first section 375 of the T-shaped fitting 380 differently.

In one embodiment, a hole 372 can be provided in the sidewall 374 surrounding flow passageway 376 to allow the tip portion of the protective sheath to protrude into the flow passageway 376. In this manner, the sensor tip 342 can be in close proximity or in direct contact with the fluid that flows in the recirculation loop 115 (FIG. 1). The distance which the sensor extends into the flow of the fluid in the fitting can be established during manufacture by varying the fitting dimensions, by varying the gland dimensions, or by varying the position of the weld. Alternately, different configurations may be used. For example, the tip portion 332 of the protective sheath 330 may be welded to the sidewall 374.

Figure 4:
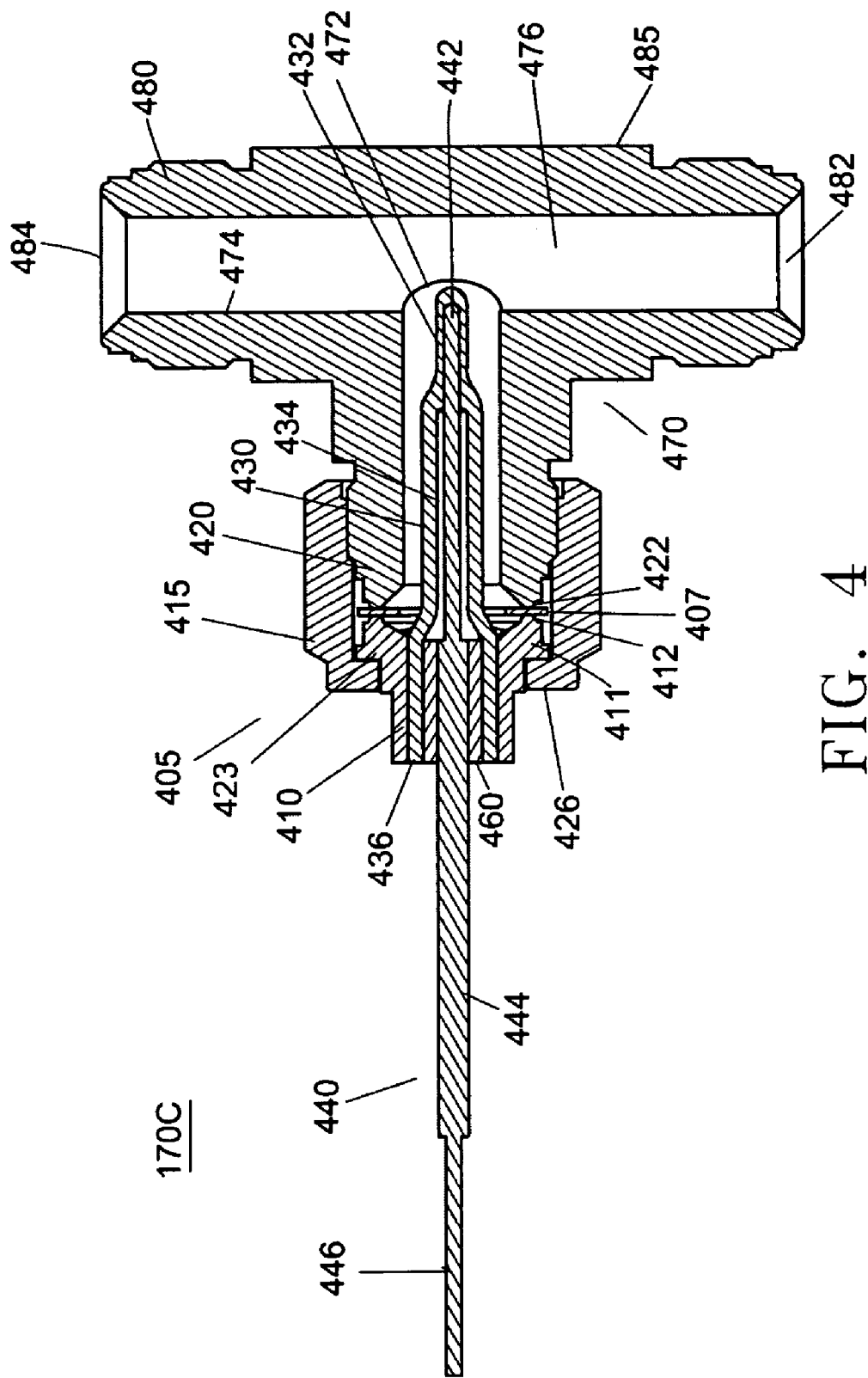
FIG. 4 shows a cross-section of another sensor assembly in accordance with another embodiment of the invention.

FIG. 4 shows a cross-section of another sensor assembly in accordance with another embodiment of the invention. In the illustrated embodiment, the sensor assembly 170C comprises a sensor subassembly 440 that includes a protective sheath 430, a sensor 442, a body 444 coupled to the sensor, and a lead portion 446 coupled to the body. The lead portion can include means for making an electrical connection. For example, wire leads can be provided. Alternately, pins and/or socket arrangements may be provided. The body can be used to couple the lead portion to the sensor.

The protective sheath 430 can comprise a tip portion 432, a transition portion 434 coupled to the tip portion 432, and an annular ring portion 436 coupled to the transition portion 434. For example, the sensor 442 can be mounted within the tip portion 432 of the protective sheath 430, and the body 444 can be mounted within the transition portion 434 of the protective sheath 430. The dimensions of the protective sheath can be dependent on the application. In one embodiment, the length of the tip portion can vary from approximately ten millimeters to approximately fifty millimeters, and the outside diameter of the tip portion can vary from approximately two millimeters to approximately ten millimeters.

The sensor can comprise a temperature sensor that can include a thermocouple, a temperature-indicating resistor, a radiation type temperature sensor, a thermistor, a thermometer, a pyrometer, a micro-electromechanical (MEM) device, or a resistance temperature detector (RTD), or a combination thereof. The sensor can include a contact-type sensor or a non-contact sensor. For example, a K-type thermocouple, a Pt sensor, a bimetallic thermocouple, or a temperature indicating platinum resistor may be used.

In the illustrated embodiment, the sensor assembly 170C comprises a coupling assembly 405 that can be coupled to the protective sheath 430. The coupling assembly 405 can include a gasket 407, a gland 410, and a nut 415. The coupling assembly 405 comprises a number of parts that can be easily assembled and/or disassembled. For example, the gland 410 can be a standard VCR gland.

The sealing end of the gland 410 has a sealing surface in the shape of a raised annular ring 412 that can engage one side of gasket 407. In addition, the sealing end of the flow assembly 470 has a sealing surface in the shape of a raised annular ring 422 that can engage the other side of gasket 407. The gland 410 can encircle a portion of the protective sheath 430. In addition, the gland 410 and the protective sheath 430 are thermal-welded together circumferentially 411.

In one embodiment, the coupling assembly 405 can also comprise a nut 415. The nut 415 has internal threads and a lip 426 that can be coupled to a mating surface 423 on the gland 410. When the nut 415 is engaged, the two sealing surfaces (412, 422) are engaged and sealed against the faces of gasket 407. Sealing the two sealing surfaces (412, 422) to gasket 407 prevents process fluid from leaking out. During maintenance and/or cleaning operations, the nut 415 can be disengaged and the sensor subassembly 440 can be cleaned and/or replaced. In alternate embodiments, other coupling assemblies may be used.

In one embodiment, a potting compound 460 can be used to couple the sensor subassembly 440 to the inside portion of the protective sheath 430. Potting compound 460 and/or the material used for the body 444 can provide isolation and/or strain relief for the lead portion. Alternately, other coupling methods may be used.

Furthermore, the sensor assembly 170C can also comprise a flow assembly 470 that can include a T-shaped fitting 480 having a first section 420 coupled to the gland assembly 405 and a second section 485 that can be used to couple the sensor assembly 170C into a high-pressure recirculation loop 115 (FIG. 1). The flow assembly 470 can comprise an inlet element 482 and a outlet element 484 that can be used to couple the sensor assembly 170C to flow pipes (not shown) in the high-pressure recirculation loop 115 (FIG. 1). For example, the inlet element 482 and a outlet element 484 may include means for welding the sensor assembly 170C to flow pipes. Alternately, the inlet element 482 and the outlet element 484 can include high-pressure connectors.

In one embodiment, a hole 472 can be provided in the sidewall 474 surrounding flow passageway 476 to allow the tip portion of the protective sheath to protrude into the flow passageway 476. In this manner, the sensor tip 442 can be in close proximity or in direct contact with the fluid that flows in the recirculation loop 115 (FIG. 1). The distance which the sensor extends into the flow of the fluid in the fitting can be established during manufacture by varying the fitting dimensions, by varying the gland dimensions, or by varying the position of the weld. Alternately, different configurations may be used. For example, the tip portion 432 of the protective sheath 430 may be welded to the sidewall 474.

Figure 5:
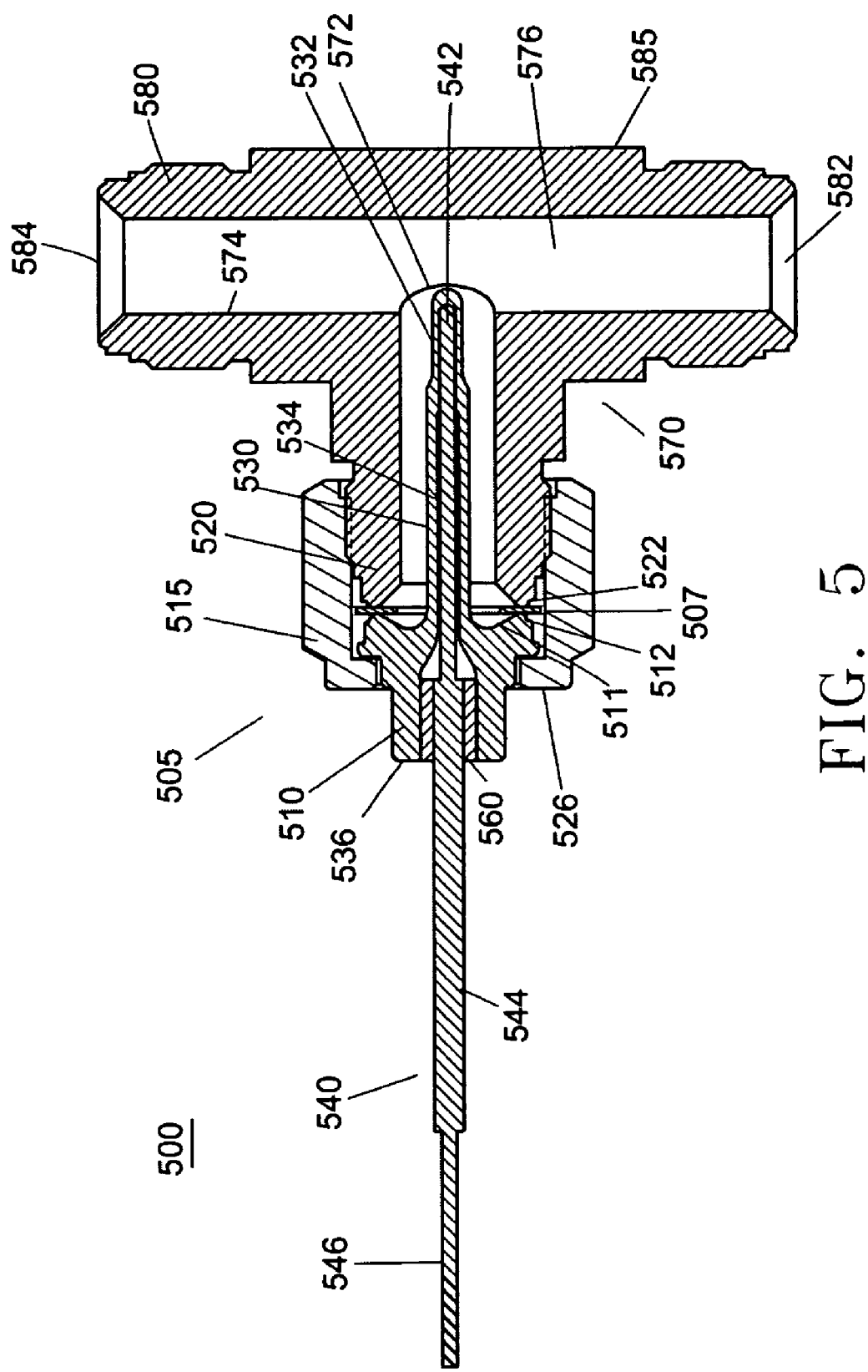
FIG. 5 shows a cross-section of another sensor assembly in accordance with another embodiment of the invention.

FIG. 5 shows a cross-section of another sensor assembly in accordance with another embodiment of the invention. In the illustrated embodiment, the sensor assembly 170D comprises a sensor subassembly 540 that includes a protective sheath 530, a sensor 542, a body 544 coupled to the sensor, and a lead portion 546 coupled to the body. The lead portion can include means for making an electrical connection. For example, wire leads can be provided. Alternately, pins and/or socket arrangements may be provided. The body can be used to couple the lead portion to the sensor.

The protective sheath 530 can comprise a tip portion 532, a transition portion 534 coupled to the tip portion 532, and an annular ring portion 536 coupled to the transition portion 534. For example, the sensor 542 can be mounted within the tip portion 532 of the protective sheath 530, and the body 544 can be mounted within the transition portion 534 of the protective sheath 530. The dimensions of the protective sheath can be dependent on the application. In one embodiment, the length of the tip portion can vary from approximately ten millimeters to approximately fifty millimeters, and the outside diameter of the tip portion can vary from approximately two millimeters to approximately ten millimeters.

The sensor can comprise a temperature sensor that can include a thermocouple, a temperature-indicating resistor, a radiation type temperature sensor, a thermistor, a thermometer, a pyrometer, a micro-electromechanical (MEM) device, or a resistance temperature detector (RTD), or a combination thereof. The sensor can include a contact-type sensor or a non-contact sensor. For example, a K-type thermocouple, a Pt sensor, a bimetallic thermocouple, or a temperature indicating platinum resistor may be used.

In the illustrated embodiment, the sensor assembly 170D comprises a coupling assembly 505 that can be coupled to the protective sheath 530. The coupling assembly 505 can include a gasket 507, and a nut 515. The coupling assembly 505 comprises a number of parts that can be easily assembled and/or disassembled.

The sealing end of the protective sleeve 530 has a sealing surface in the shape of a raised annular ring 512 that can engage one side of gasket 507. In addition, the sealing end of the flow assembly 570 has a sealing surface in the shape of a raised annular ring 522 that can engage the other side of gasket 507. The protective sleeve 510 can encircle a portion of the sensor subassembly 540.

In one embodiment, the gland assembly 505 can also comprise a nut 515. The nut 515 has internal threads and a lip 526 that can be coupled to a mating surface 523 on the protective sleeve 530. When the nut 515 is engaged, the two sealing surfaces (512, 522) are engaged and sealed against the faces of gasket 507. Sealing the two sealing surfaces (512, 522) to gasket 507 prevents process fluid from leaking out. During maintenance and/or cleaning operations, the nut 515 can be disengaged and the sensor subassembly 540 can be cleaned and/or replaced. In alternate embodiments, other coupling assemblies may be used.

In one embodiment, a polting compound 560 can be used to couple the sensor subassembly 540 to the inside portion of the protective sheath 530. Potting compound 560 and/or the material used for the body 544 can provide isolation and/or strain relief for the lead portion. Alternately, other coupling methods may be used.

Furthermore, the sensor assembly 170D can also comprise a flow assembly 570 that can include a T-shaped fitting 580 having a first section 520 coupled to the gland assembly 505 and a second section 585 that can be used to couple the sensor assembly 170D into a high-pressure recirculation loop 115 (FIG. 1). The flow assembly 570 can comprise an inlet element 582 and a outlet element 584 that can be used to couple the sensor assembly 170D to flow pipes (not shown) in the high-pressure recirculation loop 115 (FIG. 1). For example, the inlet element 582 and a outlet element 584 may include means for welding the sensor assembly 170D to flow pipes. Alternately, the inlet element 582 and the outlet element 584 can include high-pressure connectors.

In one embodiment, a hole 572 can be provided in the sidewall 574 surrounding flow passageway 576 to allow the tip portion of the protective sheath to protrude into the flow passageway 576. In this manner, the sensor tip 542 can be in close proximity or in direct contact with the fluid that flows in the recirculation loop 115 (FIG. 1). The distance which the sensor extends into the flow of the fluid in the fitting can be established during manufacture by varying the filling dimensions, by varying the gland dimensions, or by varying the position of the weld. Alternately, different configurations may be used. For example, the tip portion 532 of the protective sheath 530 may be welded to the sidewall 574.

A sensor assembly (170A, 170B, 170C, or 170D) is usable as an integral, easily replaceable, pressure sealed unit that can be used in a high-pressure fluid or gas flow system. The fluid can be a supercritical fluid. When the sensor assembly 170B is coupled to process tubing in the recirculation loop 115 FIG. 1), the sensor can be positioned within the path of the fluid or gas flowing in the tubing and the temperature of the fluid or gas can be accurately measured.

During substrate processing, providing processing fluids that are at an incorrect temperature can have a negative affect on the process. For example, an incorrect processing fluid temperature can affect the process chemistry, process dropout, and process uniformity. In another embodiment, sensor assembly may be used during a maintenance or system cleaning operation in which cleaning chemistry is used to remove process by-products and/or particles from the interior surfaces of the system. This is a preventative maintenance operation in which maintaining low contaminant levels and correct temperatures prevents material from adhering to the interior surfaces of the system that can be dislodged later during processing and that can cause unwanted particle deposition on a substrate.

Figure 6:
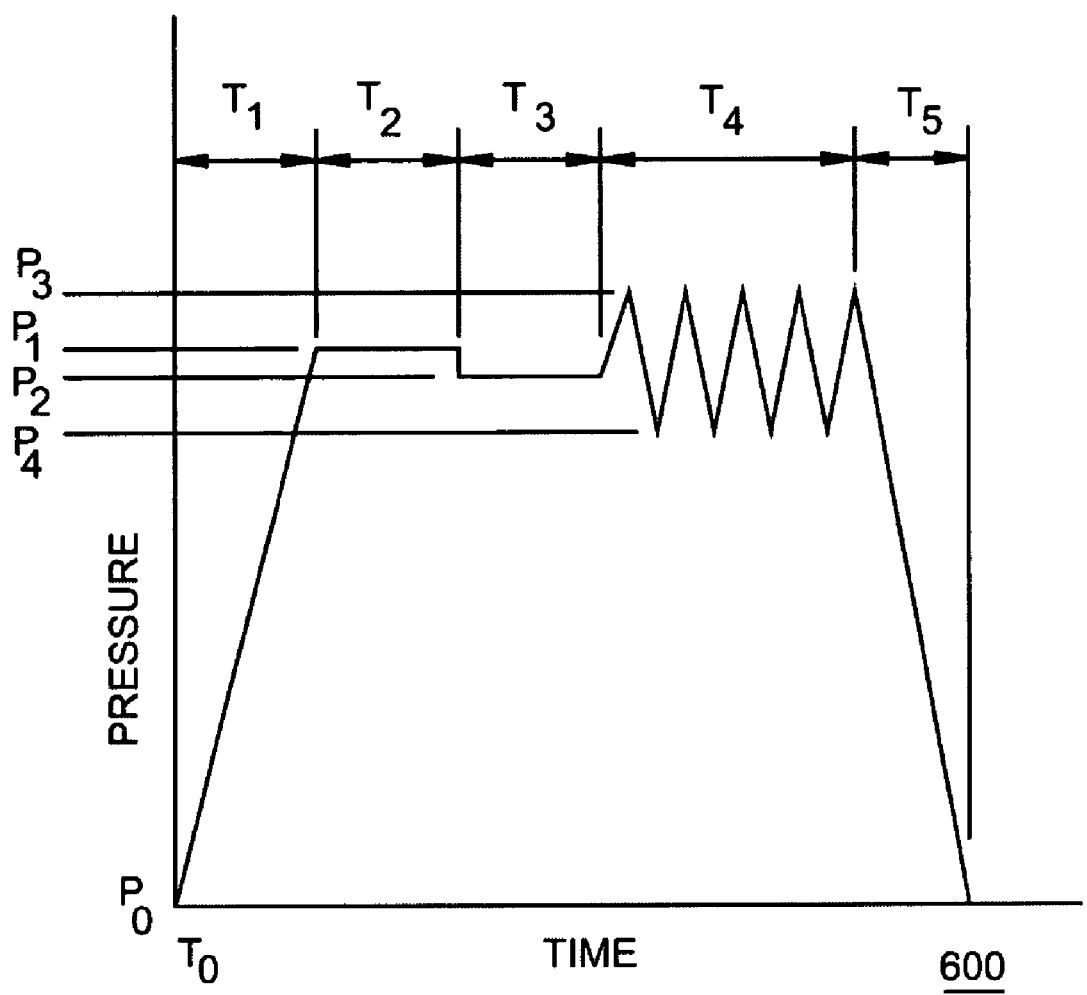
FIG. 6 illustrates an exemplary graph of pressure versus time for supercritical processes in accordance with an embodiment of the invention.

FIG. 6 illustrates an exemplary graph of pressure versus time for a supercritical process step in accordance with embodiments of the invention. In the illustrated embodiment, a graph 600 of pressure versus time is shown, and the graph 600 can be used to represent a supercritical cleaning process step, a supercritical rinsing process step, or a supercritical curing process step, or a combination thereof. Alternately, different pressures, different timing, and different sequences may be used for different processes. In addition, although a single time sequence is illustrated in FIG. 6, this is not required for the invention. Alternately, multi-sequence processes may be used.

Referring to FIGS. 1-6, prior to an initial time To, the substrate to be processed can be placed within the processing chamber 108 and the processing chamber can be sealed. For example, during cleaning, rinsing, and/or curing processes, a substrate can have post-etch and/or post-ash residue thereon. The substrate, the processing chamber, and the other elements in the recirculation loop 115 can be heated to an operational temperature. For example, the operational temperature can range from 40 to 300 degrees Celsius.

During time $T_1$, the processing chamber 108 and the other elements in the recirculation loop 115 can be pressurized. During at least one portion of the time $T_1$, the high-pressure fluid supply system 140 can be coupled into the flow path and can be used to provide temperature controlled carbon dioxide into the processing chamber and/or other elements in the recirculation loop 115. For example, the temperature variation of the temperature-controlled carbon dioxide can be controlled to be less than approximately ten degrees Celsius during the pressurization process.

In one embodiment, one or more sensor assemblies (170, 170A, 170B, 170C, 170D) located at different points in the recirculation loop 115 can operate during the time $T_1$ and can provide fluid temperature data. Alternately, the sensor assembly may not be operated during the time $T_1$.

During time $T_1$, a pump (not shown) in the recirculation system 120 can be started and can be used to circulate the temperature controlled fluid through the monitoring system, the processing chamber, and the other elements in the recirculation loop. In one embodiment, one or more sensor assemblies (170, 170A, 170B, 170C, 170D) can operate while the fluid is being circulated and can provide temperature data for the fluid flowing at different point in the loop. Alternately, the sensor assembly may not be operated during this portion of the time $T_1$.

In one embodiment, when the pressure in the processing chamber 108 exceeds a critical pressure Pc (1,070 psi), process chemistry can be injected into the recirculation loop 115 using the process chemistry supply system 130. In one embodiment, the high-pressure fluid supply system 140 can be switched off before the process chemistry is injected. Alternately, the high-pressure fluid supply system 140 can be switched on while the process chemistry is injected.

In other embodiments, process chemistry may be injected into the processing chamber 108 before the pressure exceeds the critical pressure Pc (1,070 psi) using the process chemistry supply system 130. For example, the injection(s) of the process chemistries can begin upon reaching about 1100-1200 psi. In other embodiments, process chemistry is not injected during the $T_1$ period.

In addition, one or more sensor assemblies one or more sensor assemblies (170, 170A, 170B, 170C, 170D) can operate before, during, and/or after the process chemistry is injected. The temperature data can be used to control the injection process. Process chemistry can be injected in a linear fashion, and the injection time can be based on a recirculation time. For example, the recirculation time can be determined based on the length of the recirculation path and the flow rate. In other embodiments, process chemistry may be injected in a non-linear fashion. For example, process chemistry can be injected in one or more steps.

The process chemistry can include a cleaning agent, a rinsing agent, or a curing agent, or a combination thereof that is injected into the supercritical fluid. One or more injections of process chemistries can be performed over the duration of time $T_1$ to generate a supercritical processing solution with the desired concentrations of chemicals. The process chemistry, in accordance with the embodiments of the invention, can also include one more or more carrier solvents.

Still referring to both FIGS. 1, and 6, during a second time $T_2$, the supercritical processing solution can be re-circulated over the substrate and through one or more sensor assemblies (170, 170A, 170B, 170C, 170D), the processing chamber 108, and the other elements in the recirculation loop 115.

In one embodiment, one or more sensor assemblies (170, 170A, 170B, 170C, 170D) can operate while the supercritical processing solution is being re-circulated. Alternately, the sensor assembly may not be operated while the supercritical processing solution is being re-circulated. The sensor assembly can be used to control the chemical composition while the supercritical processing solution is being re-circulated. For example, the high-pressure fluid supply system 140 can be switched off, and process chemistry not injected during the second time $T_2$. Alternatively, the high-pressure fluid supply system 140 can be switched on, and process chemistry may be injected into the processing chamber 108 during the second time $T_2$ or after the second time $T_2$.

The processing chamber 108 can operate at a pressure $P_1$ above 1,500 psi during the second time $T_2$. For example, the pressure can range from approximately 2,500 psi to approximately 3,100 psi, but can be any value so long as the operating pressure is sufficient to maintain supercritical conditions. The supercritical processing solution can be circulated over the substrate and through the recirculation loop 115. The supercritical conditions within the processing chamber 108 and the other elements in the recirculation loop 115 are maintained during the second time $T_2$, and the supercritical processing solution continues to be circulated over the substrate and through the processing chamber 108 and the other elements in the recirculation loop 115. The recirculation system 120 can be used to regulate the flow of the supercritical processing solution through the processing chamber 108 and the other elements in the recirculation loop 115.

Still referring to both FIGS. 1, and 6, during a third time $T_3$, one or more push-through processes can be performed. The high-pressure fluid supply system 140 can comprise means for providing a first volume of temperature-controlled fluid during a push-through process, and the first volume can be larger than the volume of the recirculation loop. Alternately, the first volume can be less than or approximately equal to the volume of the recirculation loop. In addition, the temperature differential within the first volume of temperature-controlled fluid during the push-through process can be controlled to be less than approximately ten degrees Celsius.

In one embodiment, one or more sensor assemblies (170, 170A, 170B, 170C, 170D) can operate during a push-through process. Alternately, the sensor assembly may not be operated during a push-through process. The sensor assembly can be used to control the chemical composition during a push-through process. For example, during the third time $T_3$, one or more volumes of temperature controlled supercritical carbon dioxide can be fed into the recirculation loop 115 from the high-pressure fluid supply system 140, and the supercritical processing solution along with process residue suspended or dissolved therein can be displaced from the processing chamber 108 and the other elements in the recirculation loop 115 through the exhaust control system 150. The sensor assembly can be used to measure the process residue in the processing solution. Providing temperature-controlled fluid during the push-through process prevents process residue suspended or dissolved within the fluid being displaced from the processing chamber 108 and the other elements in the recirculation loop 115 from dropping out and/or adhering to the processing chamber 108 and the other elements in the recirculation loop 115. In addition, during the third time $T_3$, the temperature of the fluid supplied by the high-pressure fluid supply system 140 can vary over a wider temperature range than the range used during the second time $T_2$.

In the illustrated embodiment shown in FIG. 6, a single second time $T_2$ is followed by a single third time $T_3$, but this is not required. In alternate embodiments, other time sequences may be used to process a substrate. In addition, during the second time $T_2$, the pressure $P_1$ can be higher than the pressure $P_2$ during the third time $T_3$. Alternately, $P_1$ and $P_2$ may have different values.

After the push-through process is complete, a pressure cycling process can be performed. Alternatively, one or more pressure cycles can occur during the push-through process. In other embodiments, a pressure cycling process is not required. During a fourth time $T_4$, the processing chamber 108 can be cycled through a plurality of decompression and compression cycles. The pressure can be cycled between a first pressure $P_3$ and a second pressure $P_4$ one or more times. In alternate embodiments, the first pressure $P_3$ and a second pressure $P_4$ can vary. In one embodiment, the pressure can be lowered by venting through the exhaust control system 150. For example, this can be accomplished by lowering the pressure to below approximately 1,500 psi and raising the pressure to above approximately 2,500 psi. The pressure can be increased by using the high-pressure fluid supply system 140 to provide additional high-pressure fluid.

The high-pressure fluid supply system can comprise means for providing a first volume of temperature-controlled fluid during a compression cycle, and the first volume can be larger than the volume of the recirculation loop. Alternately, the first volume can be less than or approximately equal to the volume of the recirculation loop. In addition, the temperature differential within the first volume of temperature-controlled fluid during the compression cycle can be controlled to be less than approximately ten degrees Celsius. In addition, the high-pressure fluid supply system can comprise means for providing a second volume of temperature-controlled fluid during a decompression cycle, and the second volume can be larger than the volume of the recirculation loop. Alternately, the second volume can be less than or approximately equal to the volume of the recirculation loop. In addition, the temperature differential within the second volume of temperature-controlled fluid during the decompression cycle can be controlled to be less than approximately ten degrees Celsius. Alternately, the temperature variation of the temperature-controlled fluid can be controlled to be less than approximately five degrees Celsius during a decompression cycle.

In one embodiment, one or more sensor assemblies (170, 170A, 170B, 170C, 170D) can operate during a pressure cycling process. Alternately, the sensor assembly may not be operated during a pressure cycling process. The sensor assembly can be used to control the chemical composition during a pressure cycling process. For example, during the fourth time $T_4$, one or more volumes of temperature controlled supercritical carbon dioxide can be fed into the processing chamber 108 and the other elements in the recirculation loop 115 from the high-pressure fluid supply system 140, and the supercritical processing solution along with process residue suspended or dissolved therein can be displaced from the processing chamber 108 and the other elements in the recirculation loop 115 through the exhaust control system 150. The sensor assembly can be used to measure the process residue in the processing solution before, during, and/or after a pressure cycling process.

Providing temperature-controlled fluid during the pressure cycling process prevents process residue suspended or dissolved within the fluid being displaced from the processing chamber 108 and the other elements in the recirculation loop 115 from dropping out and/or adhering to the processing chamber 108 and the other elements in the recirculation loop 115. In addition, during the fourth time $T_4$, the temperature of the fluid supplied by the high-pressure fluid supply system 140 can vary over a wider temperature range than the range used during the second time $T_2$.

In the illustrated embodiment shown in FIG. 3, a single third time $T_3$ is followed by a single fourth time $T_4$, but this is not required. In alternate embodiments, other time sequences may be used to process a substrate.

In an alternate embodiment, the high-pressure fluid supply system 140 can be switched off during a portion of the fourth time $T_4$. For example, the high-pressure fluid supply system 140 can be switched off during a decompression cycle.

During a fifth time $T_5$, the processing chamber 108 can be returned to lower pressure. For example, after the pressure cycling process is completed, then the processing chamber can be vented or exhausted to a pressure compatible with a transfer system In one embodiment, one or more sensor assemblies (170, 170A, 170B, 170C, 170D) can operate during a venting process. Alternately, the sensor assembly may not be operated during a venting process. The sensor assembly can be used to control the chemical composition during a venting process. The high-pressure fluid supply system 140 can comprise means for providing a volume of temperature-controlled fluid during a venting process, and the volume can be larger than the volume of the recirculation loop. Alternately, the volume can be less than or approximately equal to the volume of the recirculation loop. For example, during the fifth time $T_5$, one or more volumes of temperature controlled supercritical carbon dioxide can be fed into the processing chamber 108 and the other elements in the recirculation loop 115 from the high-pressure fluid supply system 140, and the remaining processing solution along with process residue suspended or dissolved therein can be displaced from the processing chamber 108 and the other elements in the recirculation loop 115 through the exhaust control system 150. The sensor assembly can be used to measure the temperature of the processing solution before, during, and/or after a venting process.

In the illustrated embodiment shown in FIG. 3, a single fourth time $T_4$ is followed by a single fifth time $T_5$, but this is not required. In alternate embodiments, other time sequences may be used to process a substrate.

In one embodiment, during a portion of the fifth time $T_5$, the high-pressure fluid supply system 140 can be switched off. In addition, the temperature of the fluid supplied by the high-pressure fluid supply system 140 can vary over a wider temperature range than the range used during the second time $T_2$. For example, the temperature can range below the temperature required for supercritical operation.

For substrate processing, the chamber pressure can be made substantially equal to the pressure inside of a transfer chamber (not shown) coupled to the processing chamber. In one embodiment, the substrate can be moved from the processing chamber into the transfer chamber, and moved to a second process apparatus or module to continue processing.

In the illustrated embodiment shown in FIG. 6, the pressure returns to an initial pressure $P_0$, but this is not required for the invention. In alternate embodiments, the pressure does not have to return to $P_0$, and the process sequence can continue with additional time steps such as those shown in time steps $T_1$, $T_2$, $T_3$, $T_4$, or $T_5$ The graph 600 is provided for exemplary purposes only. It will be understood by those skilled in the art that a supercritical processing step can have any number of different time/pressures or temperature profiles without departing from the scope of the invention. Further, any number of cleaning, rinsing, and/or curing process sequences with each step having any number of compression and decompression cycles are contemplated. In addition, as stated previously, concentrations of various chemicals and species within a supercritical processing solution can be readily tailored for the application at hand and altered at any time within a supercritical processing step.

Figure 7:
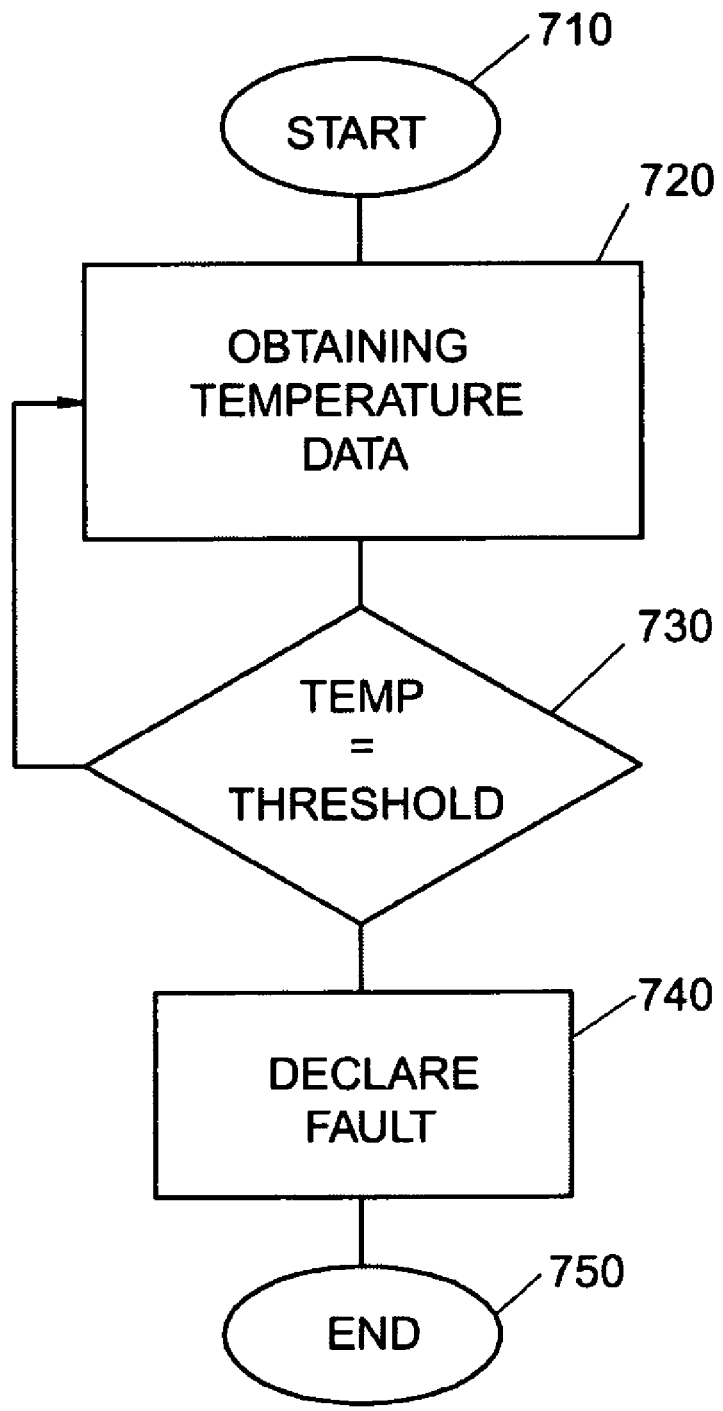
FIG. 7 illustrates a flow diagram of a method for monitoring the temperature of a high-pressure processing fluid flowing through a recirculation loop in a high-pressure processing system in accordance with an embodiment of the invention.

FIG. 7 illustrates a flow diagram of a method for monitoring the temperature of a high-pressure processing fluid flowing through a recirculation loop in a high-pressure processing system in accordance with an embodiment of the invention. Procedure 700 starts in 710 wherein a substrate can be positioned within a processing chamber that is part of the recirculation loop.

In 720, a high-pressure processing fluid can flow through the recirculation loop, and the recirculation loop can include one or more sensor assemblies through which the high-pressure processing fluid passes. Each sensor assembly can include a thermal sensor such as a thermocouple that is mounted within or in close proximity a flow passageway in which a high-pressure processing fluid is flowing. For example, the high-pressure processing fluid can include supercritical $CO_2$ and processing chemistries as described herein. For example, temperature data from the one or more sensor assemblies can be analyzed to determine the temperature of the high-pressure processing fluid.

In 730, the temperature data can be compared to a threshold value. When the temperature data is approximately equal to the threshold value, procedure 700 can branch back to 720 and continue as shown in FIG. 7. When the temperature data is not equal to the threshold value, procedure 700 can branch to 740. In 740, a fault condition can be established when the temperature data is substantially greater than or substantially less than the threshold value. For example, a normal/non-fault condition can be established when the temperature data is approximately equal to the threshold value.

Procedure 700 can end in 750.

While the invention has been described in terms of specific embodiments incorporating details to facilitate the understanding of the principles of construction and operation of the invention, such reference herein to specific embodiments and details thereof is not intended to limit the scope of the claims appended hereto. It will be apparent to those skilled in the art that modifications may be made in the embodiments chosen for illustration without departing from the spirit and scope of the invention.

What is claimed is:

1. A system for monitoring a processing fluid temperature within a high-pressure processing system, the system comprising:
   a. a recirculation loop comprising a high pressure processing chamber and a high pressure recirculation system coupled to the high pressure processing chamber, wherein the processing fluid flows through the recirculation loop;
   b. a high-pressure fluid supply system coupled to the recirculation loop and comprising means for supplying fluid to the recirculation loop;
   c. a process chemistry supply system coupled to the recirculation loop and comprising means for supplying process chemistry to the recirculation loop;
   d. a sensor assembly coupled to the recirculation loop for monitoring the temperature of the processing fluid flowing through the recirculation loop, wherein the sensor assembly is configured to operate at high pressure, wherein the sensor assembly comprises:
      i. a sensor subassembly including a sensor, a body coupled to the sensor, and an electrical connection means coupled to the body;
      ii. a protective sheath having a tip portion, a transition portion, and an annular ring portion, wherein the sensor subassembly is at least partially coupled internally to the protective sheath and the sensor is mounted within the tip portion of the protective sheath; and
      iii. a gland assembly comprising:
         (1) a gasket positioned around the protective sheath, wherein the gasket comprises a first side and a second side;
         (2) a first sealing gland positioned around the protective sheath, wherein the first sealing gland is removably coupled to the first side of the gasket;
         (3) a second sealing gland positioned around the protective sheath, wherein the second sealing gland is removably coupled to the second side of the gasket;
         (4) a first nut with threading, the first nut removably coupled to the first sealing gland; and
         (5) a second nut with threading, the second nut removably coupled to the second gland, wherein the second nut and the first nut are screwed together, thereby forcing the first gland and the second gland to compress upon the gasket, thereby sealing the gland assembly;
   e. a controller coupled to the high pressure processing chamber, the recirculation system, the high-pressure fluid supply system, the process chemistry supply system, and the sensor assembly.

2. The system as claimed in claim 1, wherein the protective sheath, the first sealing gland and the second sealing gland comprise stainless steel.

3. The system as claimed in claim 1, wherein the tip portion of the protective sheath has a length between approximately ten millimeters and approximately fifty millimeters, and wherein the tip portion of the protective sheath has an outside diameter between approximately two millimeters and approximately ten millimeters.

4. The system as claimed in claim 1, wherein the sensor assembly is configured to operate at pressures above 3000 psi.

5. The system as claimed in claim 1, wherein the processing fluid comprises gaseous, liquid, supercritical, or near-supercritical carbon dioxide, or a combination of two or more thereof.

6. The system as claimed in claim 1, wherein the process chemistry is selected from among a cleaning agent, a rinsing agent, a curing agent, a drying agent, an etching agent, and a combination of two or more thereof.

7. The system as claimed in claim 1, wherein the sensor is selected from among a thermocouple, a temperature-indicating resistor, a radiation type temperature sensor, a thermistor, a thermometer, a pyrometer, a micro-electromechanical (MEM) device, and a resistance temperature detector (RTD).

8. The system as claimed in claim 7, wherein the sensor subassembly further comprises potting compound.

9. The system as claimed in claim 7, wherein the controller can be used to determine fluid pressure and fluid flow rate.

10. A system for monitoring a processing fluid temperature within a high-pressure processing system, the system comprising:

a recirculation loop comprising a high pressure processing chamber and a high pressure recirculation system coupled to the high pressure processing chamber, wherein the processing fluid flows through the recirculation loop;

a high-pressure fluid supply system coupled to the recirculation loop and comprising means for supplying fluid to the recirculation loop;

a process chemistry supply system coupled to the recirculation loop and comprising means for supplying process chemistry to the recirculation loop;

a sensor assembly coupled to the recirculation loop for monitoring the temperature of the processing fluid flowing through the recirculation loop, wherein the sensor assembly comprises:

a gland assembly including a first sealing gland, a gasket removably coupled to the first sealing gland, a second sealing gland removably coupled to the gasket, a first nut removably coupled to the first sealing gland, a second nut removably coupled to the second sealing gland and the first nut;

a sensor subassembly including a sensor, a body coupled to the sensor, an electrical connection means coupled to the body, and a protective sheath coupled to the first sealing gland, wherein the sensor and the body are coupled internally to the protective sheath; and a flow assembly including a T-shaped fitting having a first section coupled to the second sealing gland and a second section including means for coupling the sensor assembly into the recirculation loop; and a controller coupled to the high pressure processing chamber, the recirculation system, the high-pressure fluid supply system, the process chemistry supply system, and the sensor assembly wherein the controller comprises means for obtaining temperature data for the processing fluid during a from the sensor assembly, means for comparing the temperature data to a threshold value, means for creating a fault condition when the temperature data is substantially greater than or substantially less than the threshold value, and means for creating a non-fault condition when the temperature data is approximately equal to the threshold value.

11. The system as claimed in claim 10, wherein the first sealing gland comprises a raised annular ring on one end that can engage one side of the gasket and the second sealing gland comprises a raised annular ring on one end that can engage a second side of the gasket.

12. The system as claimed in claim 10, wherein the first sealing gland is welded to an annular ring portion of the protective sheath.

13. The system as claimed in claim 10, wherein the flow assembly comprises a flow passageway and the tip portion of the protective sheath protrudes into the flow passageway.

14. The system as claimed in claim 10, wherein the sensor assembly is configured to operate at pressures above 3000 psi.

15. The system as claimed in claim 10, wherein the processing fluid comprises gaseous, liquid, supercritical, or near-supercritical carbon dioxide, or a combination of two or more thereof.

16. The system as claimed in claim 10, wherein the process chemistry is selected from among a cleaning agent, a rinsing agent, a curing agent, a drying agent, an etching agent, and a combination of two or more thereof.

17. The system as claimed in claim 10, wherein the sensor is selected from among a thermocouple, a temperature-indicating resistor, a radiation type temperature sensor, a thermistor, a thermometer, a pyrometer, a micro-electromechanical (MEM) device, and a resistance temperature detector (RTD).

18. The system as claimed in claim 17, wherein the sensor subassembly further comprises potting compound.

19. The system as claimed in claim 17, wherein the controller can be used to determine fluid pressure and fluid flow rate.

20. A system for monitoring a processing fluid temperature within a high-pressure processing system, the system comprising:
   a recirculation loop comprising a high pressure processing chamber and a high pressure recirculation system coupled to the high pressure processing chamber, wherein the processing fluid flows through the recirculation loop;
   a high-pressure fluid supply system coupled to the recirculation loop and comprising means for supplying fluid to the recirculation loop;
   a process chemistry supply system coupled to the recirculation loop and comprising means for supplying process chemistry to the recirculation loop;
   a sensor assembly coupled to the recirculation loop for monitoring the temperature of the processing fluid flowing through the recirculation loop, wherein the sensor assembly comprises:
      a sensor subassembly including a sensor, a body coupled to the sensor, an electrical connection means coupled to the body, and a protective sheath, wherein the sensor and the body are coupled internally to the protective sheath and the sensor is mounted within a tip portion of the protective sheath;
      a flow assembly comprising a T-shaped element including a first section having a sealing feature, a holding surface, and a mating feature configured to receive a portion of the sensor subassembly and a second section including means for coupling the sensor assembly into the recirculation loop; and
      a gland assembly including a sealing gland having a mating surface, a gasket removably coupled to the sealing gland and the sealing feature of the T-shaped element, and a nut removably coupled to the mating surface of the sealing gland and the holding surface of the T-shaped element; and
   a controller coupled to the high pressure processing chamber, the recirculation system, the high-pressure fluid supply system, the process chemistry supply system, and the sensor assembly wherein the controller comprises means for obtaining temperature data for the processing fluid during a from the sensor assembly, means for comparing the temperature data to a threshold value, means for creating a fault condition when the temperature data is substantially greater than or substantially less than the threshold value, and means for creating a non-fault condition when the temperature data is approximately equal to the threshold value.

21. The system as claimed in claim 20, wherein the sealing gland is welded to an annular ring portion of the protective sheath.

22. The system as claimed in claim 20, wherein the sensor assembly is configured to operate at pressures above 3000 psi.

23. The system as claimed in claim 20, wherein the processing fluid comprises gaseous, liquid, supercritical, or near-supercritical carbon dioxide, or a combination of two or more thereof.

24. The system as claimed in claim 20, wherein the process chemistry is selected from among a cleaning agent, a rinsing agent, a curing agent, a drying agent, an etching agent, and a combination of two or more thereof.

25. The system for monitoring a processing fluid temperature within a high-pressure processing system according to claim 20 wherein the sealing gland is integrally formed with the protective sheath.

26. The system as claimed in claim 20, wherein the flow assembly comprises a flow passageway and the tip portion of the protective sheath protrudes into the flow passageway.

27. The system as claimed in claim 26, wherein the flow assembly comprises an inlet element coupled to a first end of the flow passageway and an outlet element coupled to a second end of the flow passageway.

28. The system as claimed in claim 20, wherein the sensor is selected from among a thermocouple, a temperature-indicating resistor, a radiation type temperature sensor, a thermistor, a thermometer, a pyrometer, a micro-electromechanical (MEM) device, and a resistance temperature detector (RTD).

29. The system as claimed in claim 28, wherein the sensor subassembly further comprises potting compound.

30. The system as claimed in claim 28, wherein the controller can be used to determine fluid pressure and fluid flow rate.

31. A system for monitoring a processing fluid temperature within a high-pressure processing system, the system comprising:
   a recirculation loop comprising a high pressure processing chamber and a high pressure recirculation system coupled to the high pressure processing chamber, wherein the processing fluid flows through the recirculation loop;

a high-pressure fluid supply system coupled to the recirculation loop and comprising means for supplying fluid to the recirculation loop;

a process chemistry supply system coupled to the recirculation loop and comprising means for supplying process chemistry to the recirculation loop;

a sensor assembly coupled to the recirculation loop for monitoring the temperature of the processing fluid flowing through the recirculation loop, wherein the sensor assembly comprises:
  a sensor subassembly including a sensor, a body coupled to the sensor, an electrical connection means coupled to the body, and a protective sheath including a sealing feature and a mating surface, wherein the sensor and the body are coupled internally to the protective sheath and the sensor is mounted within a tip portion of the protective sheath;
  a flow assembly comprising a T-shaped element including a first section having a sealing feature, a holding surface, and a mating feature configured to receive a portion of the sensor subassembly and a second section including means for coupling the sensor assembly into the recirculation loop; and
  a coupling assembly including a gasket removably coupled to the sealing feature of the protective sheath and the sealing feature of the T-shaped element, and a nut removably coupled to the mating surface of the protective sheath and the holding surface of the T-shaped element; and a controller coupled to the high pressure processing chamber, the recirculation system, the high-pressure fluid supply system, the process chemistry supply system, and the sensor assembly wherein the controller comprises means for obtaining temperature data for the processing fluid during a from the sensor assembly, means for comparing the temperature data to a threshold value, means for creating a fault condition when the temperature data is substantially greater than or substantially less than the threshold value, and means for creating a non-fault condition when the temperature data is approximately equal to the threshold value.

32. The system as claimed in claim 31, wherein the flow assembly comprises a flow passageway and the tip portion of the protective sheath protrudes into the flow passageway.

33. The system as claimed in claim 32, wherein the flow assembly comprises an inlet element coupled to a first end of the flow passageway and an outlet element coupled to a second end of the flow passageway.

34. A system for monitoring a processing fluid temperature within a high-pressure processing system, the system comprising:
  a. a recirculation loop comprising a high pressure processing chamber and a high pressure recirculation system coupled to the high pressure processing chamber, wherein the processing fluid flows through the recirculation loop;
  b. a high-pressure fluid supply system coupled to the recirculation loop and comprising means for supplying fluid to the recirculation loop;
  c. a process chemistry supply system coupled to the recirculation loop and comprising means for supplying process chemistry to the recirculation loop;
  d. a sensor assembly coupled to the recirculation loop for monitoring the temperature of the processing fluid flowing through the recirculation loop, wherein the sensor assembly is configured to operate at high pressure, wherein the sensor assembly comprises:
    i. a sensor subassembly including a sensor, a body coupled to the sensor, and an electrical connection means coupled to the body;
    ii. a protective sheath having a tip portion, a transition portion, and an annular ring portion, wherein the sensor subassembly is at least partially coupled internally to the protective sheath and the sensor is mounted within the tip portion of the protective sheath; and
    iii. a gland assembly including:
      (1) a gasket positioned around the protective sheath, wherein the gasket comprises a first side and a second side;
      (2) a first sealing gland positioned around the protective sheath, wherein the first sealing gland is removably coupled to the first side of the gasket;
      (3) a second sealing gland positioned around the protective sheath, wherein the second sealing gland is removably coupled to the second side of the gasket;
      (4) a first nut with threading, the first nut removably coupled to the first sealing gland; and
      (5) a second nut threading, the second removably coupled to the second gland, wherein the second nut and the first nut are screwed, thereby forcing the first gland and the second gland to compress upon the gasket, thereby sealing the gland assembly; and
    iv. a controller coupled to the high pressure processing chamber, the recirculation system, the high-pressure fluid supply system, the process chemistry supply system, and the sensor assembly wherein the controller comprises means for obtaining temperature data for the processing fluid during a from the sensor assembly, means for comparing the temperature data to a threshold value, means for creating a fault condition when the temperature data is substantially greater than or substantially less than the threshold value, and means for creating a non-fault condition when the temperature data is approximately equal to the threshold value.

35. A system for monitoring a processing fluid temperature within a high-pressure processing system, the system comprising:
  a recirculation loop comprising a high pressure processing chamber and a high pressure recirculation system coupled to the high pressure processing chamber, wherein the processing fluid flows through the recirculation loop;
  a high-pressure fluid supply system coupled to the recirculation loop and comprising means for supplying fluid to the recirculation loop;
  a process chemistry supply system coupled to the recirculation loop and comprising means for supplying process chemistry to the recirculation loop;
  a sensor assembly coupled to the recirculation loop for monitoring the temperature of the processing fluid flowing through the recirculation loop, wherein the sensor assembly comprises:
    a gland assembly including a protective sheath, a first sealing gland coupled to the protective sheath, a gasket removably coupled to the first sealing gland, a second sealing gland removably coupled to the gasket, a first nut removably coupled to the first sealing gland, a second nut removably coupled to the second sealing gland and the first nut;

a sensor subassembly including a sensor, a body coupled to the sensor, and an electrical connection means coupled to the body, wherein the sensor subassembly is coupled internally to the protective sheath; and a flow assembly including a T-shaped fitting having a first section coupled to the second sealing gland and a second section including means for coupling the sensor assembly into the recirculation loop; and a controller coupled to the high pressure processing chamber, the recirculation system, the high-pressure fluid supply system, the process chemistry supply system, and the sensor assembly wherein the controller comprises means for obtaining temperature data for the processing fluid during a from the sensor assembly, means for comparing the temperature data to a threshold value, means for creating a fault condition when the temperature data is substantially greater than or substantially less than the threshold value, and means for creating a non-fault condition when the temperature data is approximately equal to the threshold value.

* * * * *

UNITED STATES PATENT AND TRADEMARK OFFICE
CERTIFICATE OF CORRECTION

PATENT NO. : 7,380,984 B2
APPLICATION NO. : 11/092232
DATED : June 3, 2008
INVENTOR(S) : Christopher D. Wuester Page 1 of 1

It is certified that error appears in the above-identified patent and that said Letters Patent is hereby corrected as shown below:

At column 15, line 37, replace "polting" with --potting--

At column 16, line 36, replace "To" with --$T_0$--

Signed and Sealed this

Fifth Day of August, 2008

JON W. DUDAS
*Director of the United States Patent and Trademark Office*